United States Patent
Kano

(10) Patent No.: US 7,751,931 B2
(45) Date of Patent: Jul. 6, 2010

(54) DESIGN SUPPORT APPARATUS AND DESIGN SUPPORT METHOD THEREFOR

(75) Inventor: Takashi Kano, Tokyo (JP)

(73) Assignee: Canon Kabushiki Kaisha (JP)

( * ) Notice: Subject to any disclaimer, the term of this patent is extended or adjusted under 35 U.S.C. 154(b) by 561 days.

(21) Appl. No.: 11/740,396

(22) Filed: Apr. 26, 2007

(65) Prior Publication Data

US 2007/0255449 A1 Nov. 1, 2007

(30) Foreign Application Priority Data

Apr. 26, 2006 (JP) .............................. 2006-122381

(51) Int. Cl.
 *G06F 19/00* (2006.01)
(52) U.S. Cl. .................. 700/230; 700/122; 703/17; 271/122; 271/125; 271/176; 271/227; 271/272
(58) Field of Classification Search .................. 700/230, 700/122; 703/17; 271/122, 125, 176, 227, 271/272
See application file for complete search history.

(56) References Cited

U.S. PATENT DOCUMENTS

| | | | | |
|---|---|---|---|---|
| 4,630,813 A * | 12/1986 | Watanabe et al. | ............ | 271/227 |
| 4,858,908 A * | 8/1989 | Yamada | ....................... | 271/176 |
| 5,913,513 A * | 6/1999 | Surya | ........................ | 271/272 |
| 2004/0041331 A1 | 3/2004 | Sonoda et al. | ............... | 271/121 |
| 2007/0274746 A1* | 11/2007 | Ehara et al. | ................... | 399/301 |
| 2008/0251998 A1* | 10/2008 | Muneyasu et al. | .......... | 271/227 |
| 2008/0296828 A1* | 12/2008 | Shoji et al. | ................ | 271/10.12 |

FOREIGN PATENT DOCUMENTS

| JP | 01-206385 A | 8/1989 |
|---|---|---|
| JP | 2615757 B2 | 3/1997 |
| JP | 2000-003292 A | 1/2000 |

* cited by examiner

*Primary Examiner*—Michael D Masinick
(74) *Attorney, Agent, or Firm*—Rossi, Kimms & McDowell LLP

(57) ABSTRACT

A design support apparatus that can easily verify the conveyance design for a flexible medium based on input design information. A transit time is calculated when a flexible medium passes a characteristic point on a conveying path based a conveying conditions that are set.

14 Claims, 38 Drawing Sheets

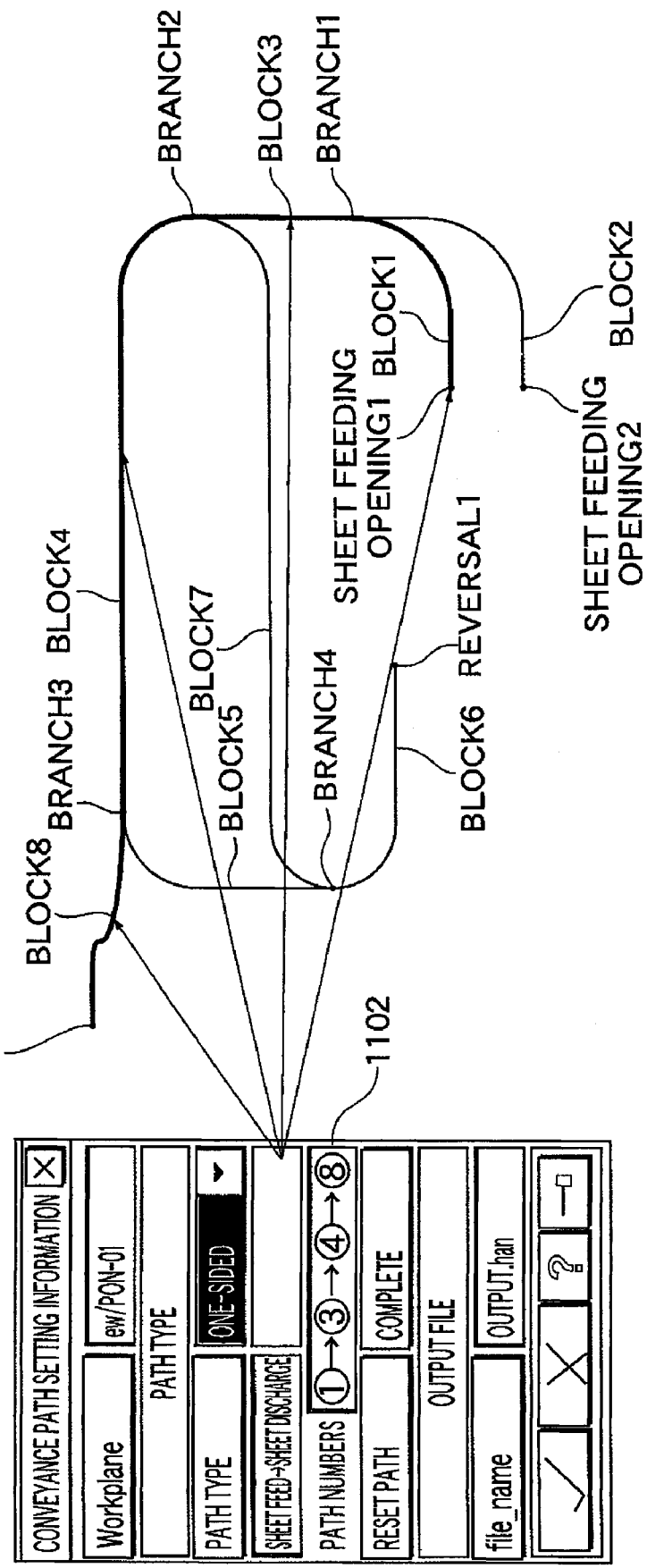

FIG. 15

```
POINT
S,PAPER CASSETTE,0.0,NIL
RR-1,SHEET FEEDING ROLLER ,15.4,NIL
RS,PRE-REGISTRATION SENSOR-ON,40.2,NIL
PR,BRANCH,28.8,NIL
RR-1,REGISTRATION ROLLER,17.7,NIL
RS,FIXING SENSOR-ON,41.6,NIL
RR-2,TRANSFER ROLLER,28.1,NIL
PR,BRANCH,61.3,NIL
RR-2,SHEET DISCHARGE ROLLER,8.6,NIL
E,SHEET DISCHARGE COMPLETE,49.3,NIL
TERM
PATH
S
-24.743359000000002,-7.0,0
-9.4194299340938397,-5.30468130535512O3,15.417422206495365
1.323701,-4.1161459999999996,10.808676072450295
20.597297999999999,1.293558,20.018402500849685
29.142156276702941,5.2187010759747405,9.4032627920212484
53.025906000000002,16.189876000000009,26.283077826971745
55.080462005592793,17.559580003728531,2.4692690088257656
64.979738999999995,24.159098,11.897450264452074
65.099999999999994,30.0,5.8421399231552984
63.018084000000002,45.492097000000001,15.631360903275985
57.930058000000002,59.101084,14.529023908812491
50.495007288712991,67.801674946758112,11.444660846972212
40.642972,79.330652000000001,15.165088566316523
35.100000000000001,91.0,12.918909448474665
19.616492000000001,100.111943,17.965704139312571
-21.271754999999999,114.517861,43.351807530433298
-29.853823810593596,115.00213720459929,8.5957215236479438
-78.159752999999995,124.632651999999999,49.256569207328859
TERM
ROLLER
-10.0,0.0,5.0
60.0,30.0,5.0
40.100000000000001,91.0,5.0
-30.0,120.0,5.0
2.2228669999999999,87.500843000000003,5.2608916786903421
22.444237000000001,42.375261000000002,4.6570439723223469
TERM
```

- POINT INFORMATION (SECTION INFORMATION)
- SHEET PATH SHAPE INFORMATION
- ROLLER INFORMATION

FIG. 16A

```
POINT
S,PAPER CASSETTE,0.0,NIL
RR-1,SHEET FEEDING ROLLER,15.4,NIL
RS,PRE-REGISTRATION SENSOR-ON,40.2,NIL
PR,BRANCH,28.8,NIL
RR-1,REGISTRATION ROLLER,17.7,NIL
RS,FIXING SENSOR-ON,41.6,NIL
RR-2,TRANSFER ROLLER,28.1,NIL
PR,BRANCH,61.3,NIL
RR-2,SHEET DISCHARGE ROLLER,8.6,NIL
TR,REVERSAL,49.3,T
TR,REVERSAL,0.0,T
RR-3,SHEET DISCHARGE ROLLER,49.3,NIL
PR,BRANCH,8.6,NIL
RR-3,REVERSAL ROLLER1,37.1,NIL
RR-3,REVERSAL ROLLER2,51.8,NIL
PR,BRANCH,42.6,NIL
RR-1,REGISTRATION ROLLER,17.7,NIL
RS,FIXING SENSOR-ON,41.6,NIL
RR-2,TRANSFER ROLLER,28.1,NIL
PR,BRANCH,61.3,NIL
RR-3,SHEET DISCHARGE ROLLER,8.6,NIL
E,SHEET DISCHARGE COMPLETE,49.3,NIL
TERM
PATH
D1
-24.743359000000002,-7.0,0
-9.4194299340938397,-5.3046813053551203,15.417422206495365
1.323701,-4.1161459999999996,10.808676072450295
20.597297999999999,1.293558,20.018402500849685
29.142156276702941,5.2187010759747405,9.4032627920212484
53.025906000000002,16.189876000000009,26.283077826971745
55.080462005592793,17.559580003728531,2.4692690088257656
64.979738999999995,24.159098,11.897450264452074
65.099999999999994,30.0,5.8421399231552984
63.018084000000002,45.492097000000001,15.631360903275985
57.930058000000002,59.101084,14.529023908812491
50.495007288712991,67.801674946758112,11.444660846972212
40.642972,79.330652000000001,15.165088566316523
35.100000000000001,91.0,12.918909448474665
19.616492000000001,100.111943,17.965704139312571
-21.271754999999999,114.517861,43.351807530433298
-29.853823810593596,115.00213720459929,8.5972715236479438
-78.159752999999995,124.63265199999999,49.256569207328859
```

POINT INFORMATION (SECTION INFORMATION)

SHEET PATH SHAPE INFORMATION
SHEET FEEDING ~REVERSAL

FIG. 16B

```
D2
-78.159752999999995,124.632651999999999,0
-29.853823810593596,115.00213720459929,49.256569207328859
-21.271754999999999,114.517861,8.5957215236479438
6.7158096199925588,90.237711259227623,37.051713115490188
8.599532,88.603519000000006,2.4937911590709376
24.259713999999999,59.566929999999999,32.990374369322417
26.979834711616643,43.431864974307203,16.362743659579237
29.367923999999999,29.266325999999999,14.365426025075212
55.080462005592793,17.559580003728534,28.252124035376028
64.979738999999995,24.159098,11.897450264452074
65.099999999999994,30.0,5.8421399231552984
63.018084000000002,45.492097000000001,15.631360903275985
57.930058000000002,59.101084,14.529023908812491
50.495007288712991,67.801674946758112,11.444660846972212
40.642972,79.330652000000001,15.165088566316523
35.100000000000001,91.0,12.918909448474665
19.616492000000001,100.111943,17.965704139312571
-21.271754999999999,114.517861,43.351807530433298
-29.853823810593596,115.00213720459929,8.5957215236479438
-78.159752999999995,124.632651999999999,49.256569207328859
TERM
ROLLER
-10.0,0.0,5.0
60.0,30.0,5.0
40.100000000000001,91.0,5.0
-30.0,120.0,5.0
2.2228669999999999,87.500843000000003,5.2608916786903421
22.444237000000001,42.375261000000002,4.6570439723223469
TERM
```

SHEET PATH SHAPE INFORMATION REVERSAL~ SHEET DISCHARGE

ROLLER INFORMATION

FIG. 18

| CLASS | ROLLER SENSOR POINT | DISTANCE [mm] | SECTION DISTANCE [mm] | SELF-START-UP [mm/s] | SELF-SHUT-DOWN [mm/s] | START-UP CONSTANT [ms] | SHUT-DOWN CONSTANT [ms] | PAPER1 ||| PAPER2 |||
|---|---|---|---|---|---|---|---|---|---|---|---|---|---|
| | | | | | | | | SECTION CONVEYANCE SPEED [mm/s] | SECTION TIME [ms] | TIME [ms] | SECTION CONVEYANCE SPEED [mm/s] | SECTION TIME [ms] | TIME [ms] |
| S | PAPER CASSETTE | 0 | 0 | 0 | 0 | 0 | 0 | 0 | 0 | 0 | 0 | 0 | 5000 |
| RR | BC ROLLER | 10 | 10 | 0 | 0 | 0 | 0 | 100 | 100 | 100 | 100 | 100 | 5100 |
| RS | PRE-REGISTRATION SENSOR | 43 | 33 | 0 | 0 | 0 | 0 | 100 | 330 | 430 | 100 | 330 | 5430 |
| RR | CONVEYING ROLLER | 94 | 51 | 0 | 0 | 0 | 0 | 100 | 510 | 940 | 100 | 510 | 5940 |
| RS | PRE-REGISTRATION SENSOR | 126 | 32 | 0 | 0 | 0 | 0 | 100 | 320 | 1260 | 100 | 320 | 6260 |
| RS | VERTICAL PATH SENSOR | 159 | 33 | 0 | 0 | 0 | 0 | 100 | 330 | 1590 | 100 | 330 | 6590 |
| PR | BRANCH | 170 | 11 | 0 | 0 | 0 | 0 | 100 | 110 | 1700 | 100 | 110 | 6700 |
| RR | CONVEYING ROLLER | 202 | 32 | 0 | 0 | 0 | 0 | 100 | 320 | 2020 | 100 | 320 | 7020 |
| RS | VERTICAL PATH SENSOR | 252 | 50 | 0 | 0 | 0 | 0 | 100 | 500 | 2520 | 100 | 500 | 7520 |
| RS | SENSOR | 263 | 11 | 0 | 0 | 0 | 0 | 100 | 110 | 2630 | 100 | 110 | 7630 |
| PR | BRANCH | 313 | 50 | 0 | 0 | 0 | 0 | 100 | 500 | 3130 | 100 | 500 | 8130 |
| RR | CONVEYING ROLLER | 343 | 30 | 0 | 0 | 0 | 0 | 100 | 300 | 3430 | 100 | 300 | 8430 |
| RS | SENSOR | 398 | 55 | 0 | 0 | 0 | 0 | 100 | 550 | 3980 | 100 | 550 | 8980 |
| RP | STOP POINT 1 | 403 | 5 | 0 | 0 | 0 | 0 | 100 | 65 | 4045 | 100 | 65 | 9045 |
| TP | STOP TIME | 403 | 0 | 0 | 0 | 0 | 30 | 0 | 20 | 4065 | 0 | 20 | 9065 |
| RR | CST DRAWING ROLLER | 503 | 100 | 0 | 0 | 0 | 0 | 200 | 500 | 4565 | 200 | 500 | 9565 |
| RS | PRE-REGISTRATION SENSOR | 538 | 35 | 0 | 0 | 0 | 0 | 200 | 175 | 4740 | 200 | 175 | 9740 |
| RS | PRE-REGISTRATION SENSOR | 544 | 6 | 0 | 0 | 0 | 0 | 200 | 30 | 4770 | 200 | 30 | 9770 |
| RR | REGISTRATION ROLLER | 554 | 10 | 0 | 0 | 0 | 0 | 200 | 50 | 4820 | 200 | 50 | 9820 |
| TL | LOOP STOP TIME | 554 | 0 | 0 | 0 | 50 | 0 | 0 | 50 | 4870 | 0 | 50 | 9870 |
| RR | SPEED CHANGE POINT | 574 | 20 | 150 | 0 | 0 | 0 | 300 | 66.6667 | 4936.67 | 300 | 66.6667 | 9936.67 |
| RR | TWO-POINT ROLLER | 594 | 20 | 0 | 0 | 0 | 0 | 450 | 52.7778 | 4922.78 | 450 | 52.7778 | 9922.78 |
| E | SHEET DISCHARGE COMPLETE | 891 | 297 | 0 | 0 | 0 | 0 | 450 | 660 | 5582.78 | 450 | 660 | 10582.8 |

FIG. 19B

| CLASS | ROLLER SENSOR POINT | DISTANCE [mm] | SECTION DISTANCE [mm] | SELF-START-UP [mm/s] | SELF-SHUT-DOWN [mm/s] | START-UP CONSTANT [ms] | SHUT-DOWN CONSTANT [ms] | PAPER1 SECTION CONVEYANCE SPEED [mm/s] | PAPER1 SECTION TIME [ms] | PAPER1 TIME [ms] | PAPER2 SECTION CONVEYANCE SPEED [mm/s] | PAPER2 SECTION TIME [ms] | PAPER2 TIME [ms] |
|---|---|---|---|---|---|---|---|---|---|---|---|---|---|
| S | PAPER CASSETTE | 0 | 0 | 50 | 0 | 50 | 0 | 0 | 0 | 0 | 0 | 0 | 5000 |
| RR | BC ROLLER | 10 | 10 | 0 | 0 | 0 | 0 | 100 | 100 | 100 | 100 | 100 | 5100 |
| RS | PRE-REGISTRATION SENSOR | 43 | 33 | 0 | 0 | 0 | 0 | 100 | 330 | 430 | 100 | 330 | 5430 |
| RR | CONVEYING ROLLER | 94 | 51 | 0 | 0 | 0 | 0 | 100 | 510 | 940 | 100 | 510 | 5940 |
| RS | PRE-REGISTRATION SENSOR | 126 | 32 | 0 | 0 | 0 | 0 | 100 | 320 | 1260 | 100 | 320 | 6260 |
| RS | VERTICAL PATH SENSOR | 159 | 33 | 0 | 0 | 0 | 0 | 100 | 330 | 1590 | 100 | 330 | 6590 |
| PR | BRANCH | 170 | 11 | 0 | 0 | 0 | 0 | 100 | 110 | 1700 | 100 | 110 | 6700 |
| RR | CONVEYING ROLLER | 202 | 32 | 0 | 0 | 0 | 0 | 100 | 320 | 2020 | 100 | 320 | 7020 |
| RS | VERTICAL PATH SENSOR | 252 | 50 | 0 | 0 | 0 | 0 | 100 | 500 | 2520 | 100 | 500 | 7520 |
| RS | SENSOR | 263 | 11 | 0 | 0 | 0 | 0 | 100 | 110 | 2630 | 100 | 110 | 7630 |
| PR | BRANCH | 313 | 50 | 0 | 0 | 0 | 0 | 100 | 500 | 3130 | 100 | 500 | 8130 |
| RR | CONVEYING ROLLER | 343 | 30 | 0 | 0 | 0 | 0 | 100 | 300 | 3430 | 100 | 300 | 8430 |
| RS | SENSOR | 398 | 55 | 0 | 0 | 0 | 0 | 100 | 550 | 3980 | 100 | 550 | 8980 |
| RP | STOP POINT 1 | 403 | 5 | 0 | 0 | 0 | 30 | 100 | 50 | 4030 | 100 | 50 | 9030 |
| TP | STOP TIME | 403 | 0 | 0 | 0 | 0 | 0 | 0 | 20 | 4050 | 0 | 20 | 9050 |
| RR | CST DRAWING ROLLER | 503 | 100 | 0 | 0 | 0 | 0 | 200 | 500 | 4550 | 200 | 500 | 9550 |
| RS | PRE-REGISTRATION SENSOR | 538 | 35 | 0 | 0 | 0 | 0 | 200 | 175 | 4725 | 200 | 175 | 9725 |
| RS | PRE-REGISTRATION SENSOR | 544 | 6 | 0 | 0 | 0 | 0 | 200 | 30 | 4755 | 200 | 30 | 9755 |
| RR | REGISTRATION ROLLER | 554 | 10 | 0 | 0 | 0 | 0 | 200 | 50 | 4805 | 200 | 50 | 9805 |
| TL | LOOP STOP TIME | 554 | 0 | 0 | 0 | 0 | 0 | 0 | 50 | 4855 | 0 | 50 | 9855 |
| RR | SPEED CHANGE POINT | 574 | 20 | 150 | 0 | 50 | 0 | 300 | 66.66667 | 4921.667 | 300 | 66.66667 | 9921.667 |
| RR | TWO-POINT ROLLER | 594 | 20 | 0 | 0 | 0 | 0 | 300 | 66.66667 | 4921.667 | 300 | 66.66667 | 9921.667 |
| E | SHEET DISCHARGE COMPLETE | 1044 | 450 | 0 | 0 | 0 | 0 | 300 | 1500 | 6421.667 | 300 | 1500 | 11421.67 |

FIG. 21A

| CLASS | ROLLER SENSOR POINT | DISTANCE [mm] | SECTION DISTANCE [mm] | SELF-START-UP [mm/s] | SELF-SHUT-DOWN [mm/s] | START-UP CONSTANT [ms] | SHUT-DOWN CONSTANT [ms] |
|---|---|---|---|---|---|---|---|
| S | PAPER CASSETTE | 0 | 0 | 0 | 0 | 0 | 0 |
| RR | BC ROLLER | 10 | 10 | 0 | 0 | 0 | 0 |
| RS | PRE-REGISTRATION SENSOR | 43 | 33 | 0 | 0 | 0 | 0 |
| RR | CONVEYING ROLLER | 94 | 51 | 0 | 0 | 0 | 0 |
| RS | PRE-REGISTRATION SENSOR | 126 | 32 | 0 | 0 | 0 | 0 |
| RS | VERTICAL PATH SENSOR | 159 | 33 | 0 | 0 | 0 | 0 |
| PR | BRANCH | 170 | 11 | 0 | 0 | 0 | 0 |
| RR | CONVEYING ROLLER | 202 | 32 | 0 | 0 | 0 | 0 |
| RS | VERTICAL PATH SENSOR | 252 | 50 | 0 | 0 | 0 | 0 |
| RS | SENSOR | 263 | 11 | 0 | 0 | 0 | 0 |
| PR | BRANCH | 313 | 50 | 0 | 0 | 0 | 0 |
| RR | CONVEYING ROLLER | 343 | 30 | 0 | 0 | 0 | 0 |
| RS | SENSOR | 398 | 55 | 0 | 0 | 0 | 0 |
| RP | STOP POINT 1 | 403 | 5 | 0 | 0 | 0 | 30 |
| TP | STOP TIME | 403 | 0 | 0 | 0 | 0 | 0 |
| RR | CST DRAWING ROLLER | 503 | 100 | 0 | 0 | 0 | 0 |
| RS | PRE-REGISTRATION SENSOR | 538 | 35 | 0 | 0 | 0 | 0 |
| RS | PRE-REGISTRATION SENSOR | 544 | 6 | 0 | 0 | 0 | 0 |
| RR | REGISTRATION ROLLER | 554 | 10 | 0 | 0 | 0 | 0 |
| TL | LOOP STOP TIME | 554 | 0 | 0 | 0 | 0 | 0 |
| RR | SPEED CHANGE POINT | 574 | 20 | 0 | 0 | 0 | 0 |
| RR | TWO-POINT ROLLER | 594 | 20 | 150 | 0 | 50 | 0 |
| E | SHEET DISCHARGE COMPLETE | 891 | 297 | 0 | 0 | 0 | 0 |

FIG. 21B

| SECTION CONVEYANCE SPEED [mm/s] | SECTION TIME [ms] | TIME [ms] | SECTION CONVEYANCE SPEED [mm/s] | SECTION TIME [ms] | TIME [ms] | SECTION CONVEYANCE SPEED [mm/s] | SECTION TIME [ms] | TIME [ms] | SECTION CONVEYANCE SPEED [mm/s] | SECTION TIME [ms] | TIME [ms] |
|---|---|---|---|---|---|---|---|---|---|---|---|
| 0 | 0 | 0 | 0 | 0 | 5000 | 0 | 0 | 10000 | 0 | 0 | 15000 |
| 100 | 100 | 100 | 100 | 100 | 5100 | 100 | 100 | 10100 | 100 | 100 | 15100 |
| 100 | 330 | 430 | 100 | 330 | 5430 | 100 | 330 | 10430 | 100 | 330 | 15430 |
| 100 | 510 | 940 | 100 | 510 | 5940 | 100 | 510 | 10940 | 100 | 510 | 15940 |
| 100 | 320 | 1260 | 100 | 320 | 6260 | 100 | 320 | 11260 | 100 | 320 | 16260 |
| 100 | 330 | 1590 | 100 | 330 | 6590 | 100 | 330 | 11590 | 100 | 330 | 16590 |
| 100 | 110 | 1700 | 100 | 110 | 6700 | 100 | 110 | 11700 | 100 | 110 | 16700 |
| 100 | 320 | 2020 | 100 | 320 | 7020 | 100 | 320 | 12020 | 100 | 320 | 17020 |
| 100 | 500 | 2520 | 100 | 500 | 7520 | 100 | 500 | 12520 | 100 | 500 | 17520 |
| 100 | 110 | 2630 | 100 | 110 | 7630 | 100 | 110 | 12630 | 100 | 110 | 17630 |
| 100 | 500 | 3130 | 100 | 500 | 8130 | 100 | 500 | 13130 | 100 | 500 | 18130 |
| 100 | 300 | 3430 | 100 | 300 | 8430 | 100 | 300 | 13430 | 100 | 300 | 18430 |
| 100 | 550 | 3980 | 100 | 550 | 8980 | 100 | 550 | 13980 | 100 | 550 | 18980 |
| 100 | 65 | 4045 | 100 | 65 | 9045 | 100 | 65 | 14045 | 100 | 65 | 19045 |
| 0 | 20 | 4065 | 0 | 20 | 9065 | 0 | 20 | 14065 | 0 | 20 | 19065 |
| 200 | 500 | 4565 | 200 | 500 | 9565 | 200 | 500 | 14565 | 200 | 500 | 19565 |
| 200 | 175 | 4740 | 200 | 175 | 9740 | 200 | 175 | 14740 | 200 | 175 | 19740 |
| 200 | 30 | 4770 | 200 | 30 | 9770 | 200 | 30 | 14770 | 200 | 30 | 19770 |
| 200 | 50 | 4820 | 200 | 50 | 9820 | 200 | 50 | 14820 | 200 | 50 | 19820 |
| 0 | 50 | 4870 | 0 | 50 | 9870 | 0 | 50 | 14870 | 0 | 50 | 19870 |
| 300 | 66.6667 | 4936.67 | 300 | 66.6667 | 9936.67 | 300 | 66.6667 | 14936.7 | 300 | 66.6667 | 19936.7 |
| 450 | 52.7778 | 4989.44 | 450 | 52.7778 | 9989.44 | 450 | 52.7778 | 14989.4 | 450 | 52.7778 | 19989.4 |
| 450 | 660 | 5649.44 | 450 | 660 | 10649.4 | 450 | 660 | 15649.4 | 450 | 660 | 20649.4 |
| | | PAPER1 | | | PAPER2 | | | PAPER3 | | | PAPER4 |

COLUMNS THAT ARE NEWLY ADDED ACCORDING TO NUMBER OF SHEETS

START-UP

SHUT-DOWN

SELF-START-UP

SELF-SHUT-DOWN

FIG. 27A

| CLASS | ROLLER SENSOR POINT | DISTANCE [mm] | SECTION DISTANCE [mm] | SELF-START-UP [mm/s] | SELF-SHUT-DOWN [mm/s] | START-UP CONSTANT [ms] | SHUT-DOWN CONSTANT [ms] | PAPER1 ||| 
|---|---|---|---|---|---|---|---|---|---|---|
| | | | | | | | | SECTION CONVEYANCE SPEED [mm/s] | SECTION TIME [ms] | TIME [ms] |
| S | PAPER CASSETTE | 0 | 0 | 0 | 0 | 0 | 0 | 0 | 0 | 0 |
| RR-1 | BC ROLLER | 10 | 10 | 0 | 0 | 100 | 0 | 300 | 83.3333 | 83.3333 |
| RS-3-ON | PRE-REGISTRATION SENSOR | 43 | 33 | 0 | 0 | 0 | 0 | 300 | 110 | 193.333 |

FIG. 28A

| CLASS | ROLLER SENSOR POINT | DISTANCE [mm] | SECTION DISTANCE [mm] | SELF-START-UP [mm/s] | SELF-SHUT-DOWN [mm/s] | START-UP CONSTANT [ms] | SHUT-DOWN CONSTANT [ms] | PAPER1 | | |
|---|---|---|---|---|---|---|---|---|---|---|
| | | | | | | | | SECTION CONVEYANCE SPEED [mm/s] | SECTION TIME [ms] | TIME [ms] |
| S | PAPER CASSETTE | 0 | 0 | 0 | 0 | 0 | 0 | 0 | 0 | 0 |
| RR-1 | BC ROLLER | 10 | 10 | 150 | 0 | 0 | 0 | 300 | 58.3333 | 58.3333 |
| RS-3-ON | PRE-REGISTRATION SENSOR | 43 | 33 | 0 | 0 | 100 | 0 | 300 | 110 | 168.333 |

2601, 2602, 2603

DESIGN SUPPORT APPARATUS AND DESIGN SUPPORT METHOD THEREFOR

BACKGROUND OF THE INVENTION

1. Field of the Invention

The present invention relates to a design support apparatus for performing a design support for an apparatus such as a sheet conveying apparatus, and a design support method therefor.

2. Description of the Related Art

In recent years, accompanying the improvements in computer performance, the switch from two-dimensional CAD to three-dimensional CAD is progressing rapidly with respect to CAD that is used for machine design service. Further, nowadays it has become common to verify the device design using a simulator by utilizing three-dimensional CAD data that is created prior to manufacturing the actual apparatus (actual machine).

In the case of designing an apparatus that conveys a sheet member such as a paper sheet or a film also, there is a demand for verifying the conveyance design for the sheet member (sheet conveyance design) before manufacturing the actual apparatus. Examples of an apparatus that conveys a sheet member such as a paper sheet or a film include a copying machine, a laser beam printer, an inkjet printer, a card printer, and a facsimile device.

When verifying the sheet conveyance design, the machine designer performs modeling of a sheet conveying unit on three-dimensional CAD, defines the principal section, cuts the sheet conveying unit to form a section, and creates a two-dimensional plotting thereof. The machine designer then designs attributes that are required for sheet conveying such as the sheet conveying path, sensors, conveying rollers, conveying guides, sheet guides, and flappers. Thereafter, in order to pass the information to a software designer, the machine designer verifies the conveying speed and the control method in each component section.

Speed enhancement and downsizing is being implemented more and more in recent apparatuses, and it is thus necessary for a large amount of sheets to be quickly conveyed within a narrow apparatus at one time. Verifying a conveying speed or a control method at the time of the concept design in order to satisfy this design specification has become a large burden for machine designers.

Generally, a machine designer graphs (diagrams) the moving distances on a time axis of the leading ends and the trailing ends of sheets to be conveyed, and finalizes the design specifications while checking whether or not a space between sheets is ensured. When this diagram is decided, the machine designer graphs (makes a timing chart for) speed variations in a plurality of rollers or ON/OFF operations on the time axis of a sensor based on that diagram, and finalizes the roller control information. At this time, since the plurality of rollers are not rotationally driven independently, but instead are divided into several groups for each motor and driven, there is a risk that it will not be possible to make the sheets flow in the manner decided in the diagram. Therefore, the machine designer conducts a final check.

A timing chart in which definitions for rollers and sensors and the like are completed, is used as a software design specification sheet and also as a driving chart for checking the operations of the actual machine before the firmware is completed.

Japanese Patent No. 2615757 discloses technology that increases efficiency by systemizing this kind of timing chart (also referred to under another name as "input chart") as a creation support tool, instead of creating the timing chart by performing a manual operation. More specifically, according to this technology, data for the X and Y coordinates of change points P1, P2, P3, and P4 at which the conveying speed of the leading end of a sheet that is conveyed inside an image output apparatus is graphed to express as sheet status data. Based on this sheet status data, the movements of the trailing end of a sheet and of paper sheets comprising a plurality of sheets are graphed. A timing chart is then created from the resulting graph.

Further, Japanese Laid-Open Patent Publication (Kokai) No. 2000-003292 discloses technology that increases efficiency by systemizing a created timing chart as a verification tool, instead of the designer him or her self printing out a sequence program for creating the timing chart to correct bugs and performing verification by operating the actual machine. More specifically, according to this technology, input contact points of the timing chart are extracted and whether or not desired operations are satisfied is detected by performing a comparison with the sequence program.

With a conventional design support apparatus, when creating a diagram that shows the movement of a sheet, a graph of the sheet trailing end is created by simply subjecting a graph of the sheet leading end to offset duplication with respect to the paper size. Therefore, when actually conveying sheets in a copying machine, it has not been possible to represent on a diagram a graph that shows a state in which, for example, a sheet collides with a stopped roller and the sheet bends to create a loop.

Further, although a start-up curve, a shut-down curve and the like that are referred to as "stabilization constants" exist for each motor, it has not been possible to plot diagrams with a simple calculation that incorporates these factors. In order to determine the X and Y coordinates of change points P1 and P2 on a graph, it has been necessary to calculate the transit time based on the distance and speed each time. Consequently, when the speed of one section is increased it is necessary to recalculate the time taken for a sheet to pass through all the sections, and it has not been possible to change the diagram in question in real time.

Further, when passing through a plurality of sheets, graphs are created on the premise that the graph for the first sheet is duplicated. Thus, when the control method for the second sheet is not the same as for the first, it has not been possible to simply perform additional plotting. Further, after creating a diagram, it has been necessary to create a timing chart while working out linear-function intersecting point formulas one by one, which has required man hours.

For these reasons, since unsatisfactory points remain with respect to the accuracy and plot creation time of the diagram itself, there has been a problem regarding the accuracy and efficiency of a timing chart that is created based on the diagram.

Originally, conventional design support apparatuses have been utilized on the premise that upon finishing a study of a sheet conveying concept, the sheet conveying concept is illustrated in a diagram, and it has not been assumed that the design support apparatuses will be used from the design concept stage. Consequently, design support apparatuses have been unsuitable for repeated study of concepts.

Further, an approach in which a sheet conveyance sequence is studied using only a diagram has been understandable to only designers. Accordingly, it has been difficult for personnel in evaluation and productions departments such as the quality assurance department, the trial manufacture department, and factory departments to immediately understand the manner in which sheets move inside the copying machine main unit. Therefore, at the time of a design review, time has been required for sharing design information.

Furthermore, even when the diagram is completed, since each roller does not operate independently there has been the following problem. Namely, in the case of a common copying machine or printer, a plurality of conveying rollers are rotationally driven at the same time employing a single motor as a power source. Therefore, there are sections in which the speed must be uniform even if the rollers are separate. At the time of diagram creation, diagrams are sometimes plotted in which these kinds of sections are ignored and the speed (inclination) is changed. Consequently, there has been the risk that a mistake will occur in the speed settings with respect to drive division for such rollers.

On the other hand, although Japanese Laid-Open Patent Publication (Kokai) No. 2000-003292 discloses technology that evaluates the correctness of a timing chart as described above, this technology has basically only studied the ON/OFF timing time. The technology has not compared the speed of the ON sections.

SUMMARY OF THE INVENTION

The present invention provides a design support apparatus that can easily verify the conveyance design for a flexible medium based on input design information and a design support method therefor.

The present invention also provides a design support apparatus that can verify the correctness of set conveying conditions that are set and a design support method therefor.

To attain the above object, according to a first aspect of the present invention, there is provided a design support apparatus adapted to verify a design for conveying a flexible medium, based on design information relating to a conveying path, comprising a setting unit adapted to set conveying conditions, and a transit time calculating unit adapted to calculate a transit time when the flexible medium passes a characteristic point on the conveying path based the conveying conditions that are set.

To attain the above object, according to a second aspect of the present invention, there is provided a design support method that verifies a design for conveying a flexible medium based on design information relating to a conveying path, comprising a setting step of setting conveying conditions, and a transit time calculating step of calculating a transit time when the flexible medium passes a characteristic point on the conveying path based the conveying conditions that are set.

To attain the above object, according to a third aspect of the present invention, there is provided a computer-readable storage medium that stores a program that implements a design support method that verifies a design for conveying a flexible medium based on design information relating to a conveying path, the design support method comprising a setting step of setting conveying conditions, and a transit time calculating step of calculating a transit time when the flexible medium passes a characteristic point on the conveying path based the conveying conditions that are set.

The above and other objects, features, and advantages of the invention will become more apparent from the following detailed description taken in conjunction with the accompanying drawings.

BRIEF DESCRIPTION OF THE DRAWINGS

FIGS. 5A and 5B are views showing a GUI menu that a designer operates in order to specify points when adding attributes of characteristic points to a sheet conveying path at step S2.

FIGS. 6A and 6B are views showing a sheet conveying path in which the positions of "sheet feeding openings" are defined, and a GUI menu.

FIG. 13 is a view showing a screen for setting a conveying path for one-sided printing.

FIG. 15 is a view showing the sheet conveyance information at a time of one-sided printing that is output at step S8.

FIGS. 16A and 16B are views showing the sheet conveyance information at a time of double-sided printing.

FIG. 18 is a table that displays distance related information.

FIGS. 19A and 19B are views showing a GUI menu of a spreadsheet section.

FIGS. 21A and 12B are views showing an example in which the items "section conveying speed", "section time", and "time" are added accompanying setting of the number of sheets.

FIGS. 27A to 27C are views showing a distance-related information table, a diagram, and a timing chart in a case that incorporates a start-up constant.

FIGS. 28A to 28C are views showing a distance-related information table, a diagram, and a timing chart in a case in which a self-start-up speed is set in addition to a start-up constant.

DETAILED DESCRIPTION OF THE PREFERRED EMBODIMENTS

Embodiments of the design support apparatus and design support method of the present invention will now be described with reference to the drawings. The design support apparatus of the present embodiment is applied to a design support system that is used when studying a conveyance design concept for a flexible medium. The design support system is implemented by an information processing apparatus.

(Configuration of Information Processing Apparatus)

Figure 1:
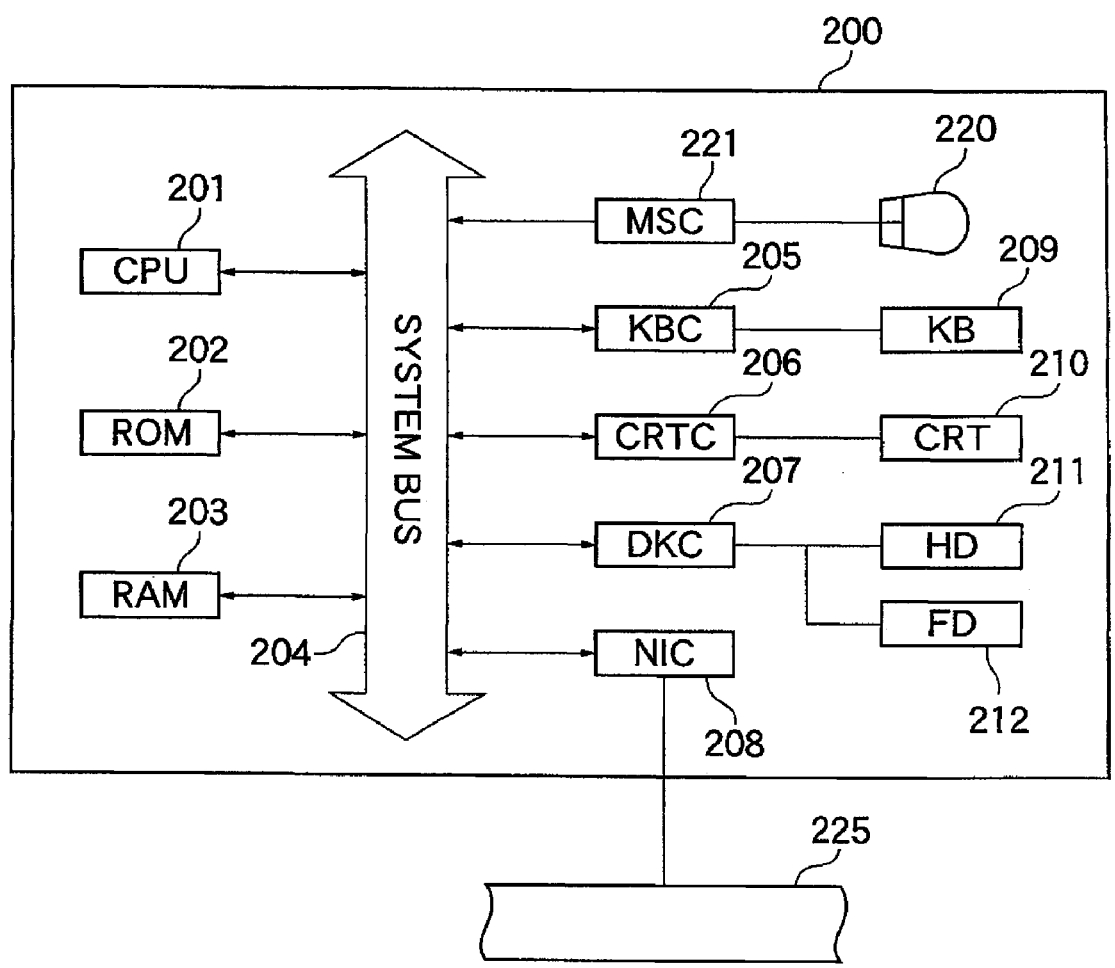
FIG. 1 is a view showing the configuration of an information processing apparatus as a design support system according to an embodiment of the present invention.
Figure 2:
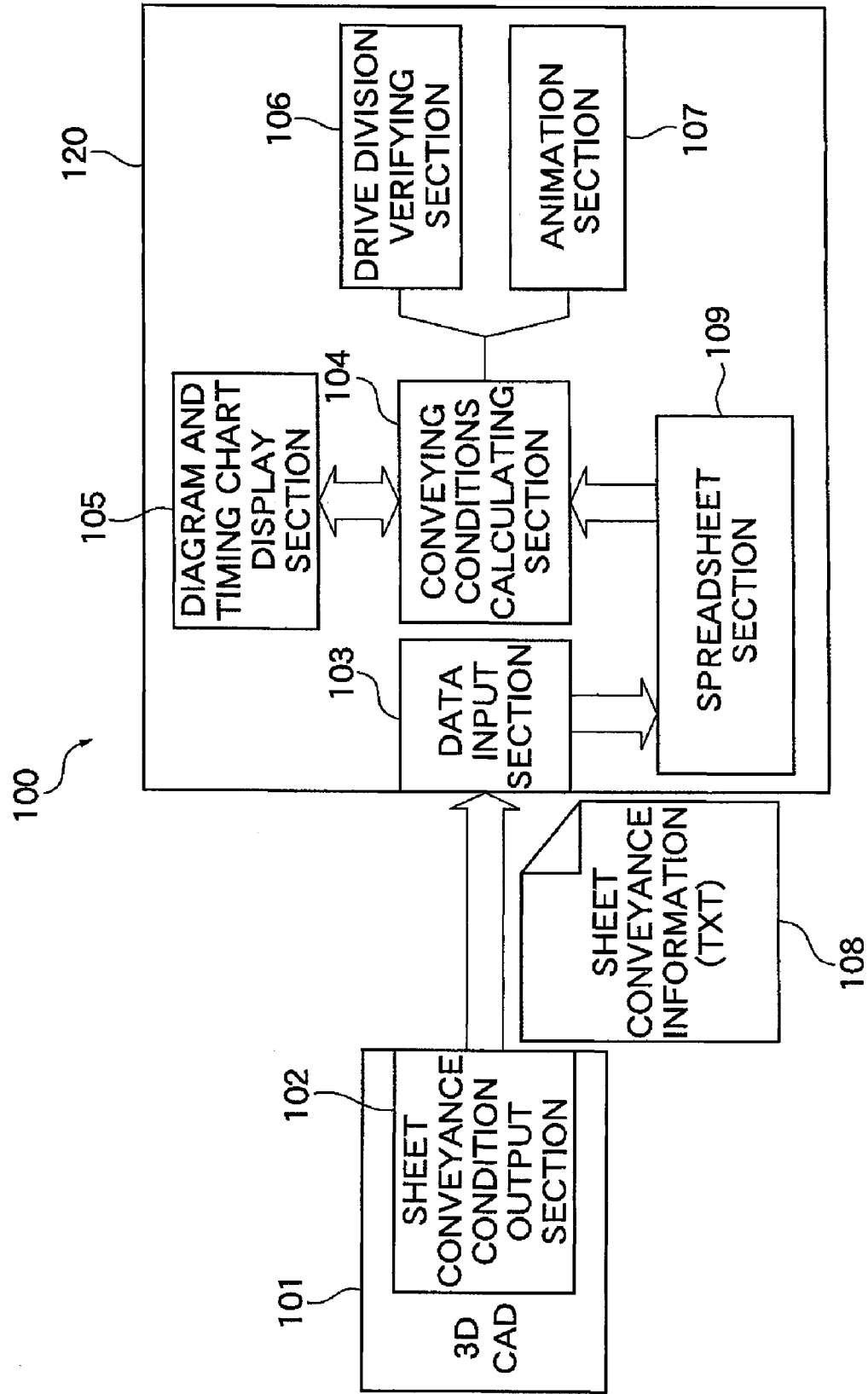
FIG. 2 is a view showing the overall configuration of the design support system.

FIG. 1 is a view showing the configuration of an information processing apparatus (computer) as a design support system 100 (FIG. 2). A computer 200 has a configuration in which a CPU 201, a ROM 202, a RAM 203, a mouse controller (MSC) 221, a keyboard controller (KBC) 205, a CRT controller (CRTC) 206, a disk controller (DKC) 207, and a network interface controller (NIC) 208 are connected to a system bus 204.

A mouse 220 is connected to the MSC 221. A keyboard (KB) 209 is connected as an input device to the KBC 205. A display (CRT) 210 is connected as a display device to the CRTC 206. A hard disk (HD) 211 and a flexible disk (FD) 212 are connected to the DKC 207. A network 225 is connected to the NIC 208.

The CPU 201 carries out overall control of each portion that is connected to the system bus 204 by executing software that is stored on the ROM 202 or the HD 211, or software that is supplied from the FD 212. More specifically, the CPU 201 reads out and executes predetermined processing programs from the ROM 202, the HD 211, or the FD 212, and performs control for implementing functions that are described later. The computer 200 may also have a configuration in which another device such as an optical recording apparatus is connected thereto in addition to the HD 211 and the FD 212.

The RAM 203 functions as the main memory or work area of the CPU 201. The MSC 221 controls an instruction input from the mouse 220. The KBC 205 controls an instruction input from the KB 209. The CRTC 206 controls a display of the display 210.

The DKC 207 controls access to the HD 211 and the FD 212 that store a boot program, various applications, edit files, user files, network management programs, and processing programs that are described later and the like. The NIC 208 performs two-way exchanges of data with an apparatus or system connected to the network 225.

The display 210 may be a liquid crystal display, a plasma display, a FED display, an EL display or the like. In each of these cases, display information is input to the display 210 through each controller so that an optimal display is performed in conformity with the display format or driving conditions of the display 210.

An input apparatus is not limited to the mouse 220 and the keyboard 209, and a common input device can also be used. For example, a digitizer, or an input pen can be used, and these can also be used in combination according to necessity. When an input device is changed a controller corresponding thereto is used, similarly to the case of the display 210. Naturally, the configuration of a computer to be applied for the design support system is not limited to the configuration shown in FIG. 1.

(Overall View of Design Support System)

FIG. 2 is a view showing the overall configuration of a design support system. As described above, the design support system 100 is implemented by the computer 200, and comprises a 3-D (mechanical system) CAD apparatus 101 and a design support apparatus (simulator) 120.

The 3-D CAD apparatus 101 has a sheet conveyance condition output section 102. Sheet conveyance information 108 in which sheet conveyance attribute information is added to data for parts such as rollers, sensors and guides that are related to sheet conveyance is output from the sheet conveyance condition output section 102. The function of the sheet conveyance condition output section 102 is implemented by a customized program that is incorporated in the 3-D CAD apparatus 101. According to the present embodiment, for example, a text file in ASCII format is used for sheet conveyance information 108.

The design support apparatus 120 comprises a data input section 103, a spreadsheet section 109, a conveying conditions calculating section 104, a diagram and timing chart display section 105, a drive division verifying section 106 and an animation section 107.

The spreadsheet section 109, having a tabular format display section and a conveying conditions input section, reads in through the data input section 103 the sheet conveyance information that is output from the 3-D CAD apparatus 101, and displays the conveying conditions input section in a tabular format. Conveying conditions such as paper size, loop amount, number of conveyed sheets, conveying speed, stop time, sheet feeding time and the like can be input through the displayed conveying conditions input section.

Based on the input conveying conditions, the conveying conditions calculating section 104 calculates the conveying time and outputs display data via the diagram and timing chart display section 105 based on the calculation result. Thus, a diagram and a timing chart are displayed.

According to the present embodiment, based on the display result of this diagram and timing chart, a check is performed to ascertain whether or not predetermined requirements such as the space between sheets, rollers, and the ON/OFF timing of sensors satisfy the operation specifications. Accompanying this check, designing to decide on conveying conditions such as the paper sizes, loop amount, number of conveyed sheets, conveying speed, stop time and sheet feeding time is performed.

When the operation specifications are satisfied, the animation section 107 animates the movements of sheets and outputs the animation to the display 210. It is thereby possible to easily check the movement of sheets on a screen on the display 210. Accordingly, the designer can share design information with personnel from the related departments to enable the easy performance of verification as to whether or not there are places with a large curvature in the sheet conveyance information and whether or not sheet stopping positions at a time of double-sided printing are appropriate.

The drive division verifying section 106 performs drive division verification to verify whether or not speed restrictions are satisfied by the drive division of the rollers. This drive division verification checks whether or not conveying conditions such as speed settings and stop times are the like are alright even when the paper size is changed.

A verification operation with respect to a design for conveying a flexible medium carried out by the design support system 100 will now be described.

(Sheet Conveyance Information Output from Mechanical System CAD)

Figure 3:
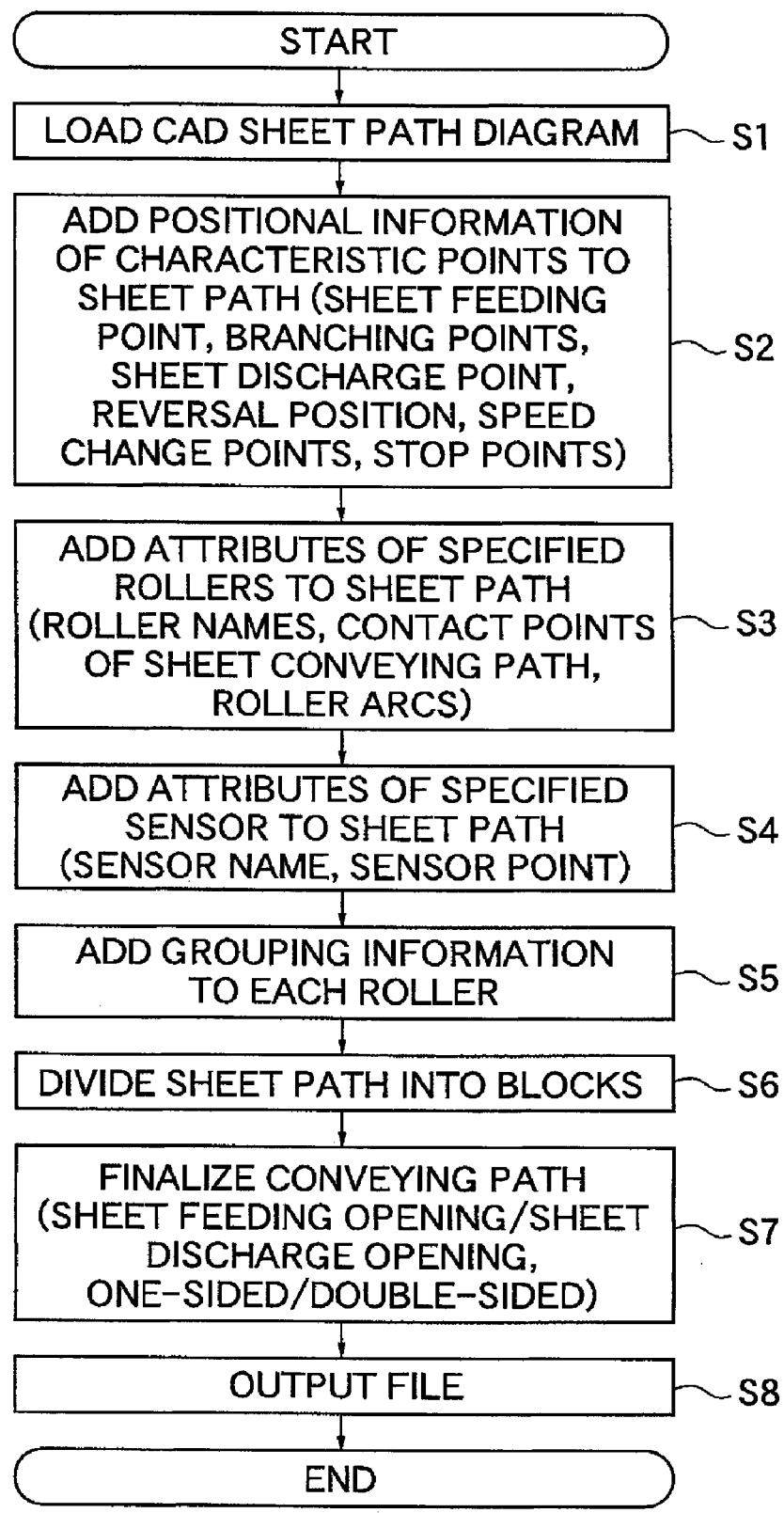
FIG. 3 is a flowchart showing the procedure of a process for outputting sheet conveyance information in a file format from a sheet conveyance condition output section inside a 3-D CAD apparatus.

First, the operations of the 3-D (mechanical system) CAD apparatus 101 are described. FIG. 3 is a flowchart showing the procedure of a process for outputting the sheet conveyance information 108 in a file format from the sheet conveyance condition output section 102 inside the 3-D CAD apparatus 101. A program for executing this process is stored on a storage medium (hard disk 211), and is executed by the CPU 201.

First, in the 3-D (mechanical system) CAD apparatus 101, the CPU 201 loads CAD sheet path diagram in which a sheet conveying path, rollers, sensors and the like are to be plotted (step Si). The CPU 201 detects characteristic points that are specified on the plotted sheet conveying path using the mouse 220, and adds that positional information on the sheet conveying path (step S2). Examples of specified characteristic points include a "sheet feeding point", a "sheet discharge point", a "reversal position", a "branching point", a "speed change point", and a "stop point".

The CPU 201 detects rollers that were specified using the mouse 220 or the keyboard 209 and adds attributes for the "roller names", "roller arcs", and "contact points of sheet conveying path" to the rollers (step S3). Further, the CPU 201 detects a sensor that was specified using the mouse 220 or the keyboard 209 and adds attributes for the "sensor name" and "sensor point" (step S4). With respect to the specified rollers, the CPU 201 also adds grouping information for each roller that is driven by the same driving source (step S5).

The sensor point is a point which, when executing simulation of sheet conveying, is recognized as ON by the sensor upon the leading end of a sheet passing through that point, and is recognized as ON until the trailing end of the sheet finishes passing that point.

The CPU 201 performs processing for dividing the sheet conveying path into blocks (step S6). At this time, processing for dividing is performed that both end points of the every block are any one of group consisting of the "sheet feeding point", "branching point", "sheet discharge point", and "reversal position" that were specified when adding attributes to the characteristic points on the loaded sheet conveying path at step S2.

Further, with respect to the blocks that are divided at step S6, classification is performed for the sheet conveying path according to the one-sided/double-sided printing cases, and block numbers of the blocks are sorted in the order that the sheets flow. For one-sided printing, the block numbers of the blocks positioned from a sheet feeding opening to a sheet discharge opening are sorted. In contrast, for double-sided printing, the block numbers of the blocks positioned from the sheet feeding opening to the reversal position and the block numbers of the blocks positioned from the reversal position to the sheet discharge opening are sorted. The sheet conveying path that was examined is then finalized (step S7). Thereafter, the sheet conveyance information 108 is output to the design support apparatus 120 in file format (step S8). Thereafter, the present operation is terminated.

(Sheet Conveying Path Information)

Figure 4:
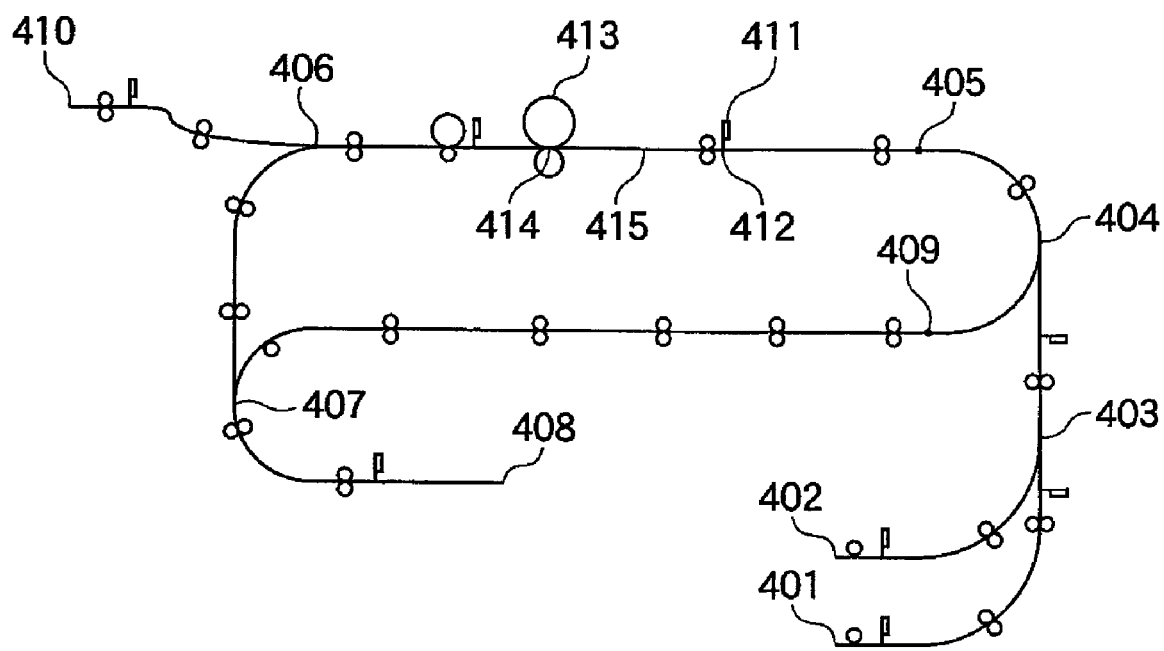
FIG. 4 is a view showing drawing information in which a sheet conveying path is plotted that is read in at step S1.

FIG. 4 is a view showing drawing information in which a sheet conveying path that is read in at step S1 is plotted. A sheet conveying path information 415 is segment information that is derived by the designer based on the positional information of sheet conveying guides, and it represents with a single line the path that a sheet to be conveyed is predicted to pass through. In the sheet conveying path information 415, the sheet feeding points 401 and 402, the branching points 403, 404, 406, and 407, the reversal position 408, the speed change point 405, the stop point 409, and the sheet discharge point 410 are provided as the characteristic points. Further, in the sheet conveying path 415 are also provided a roller point 414 that is formed by a roller 413 and the sheet conveying path 415, and a sensor point 412 that is formed by a sensor 411 and the sheet conveying path 415. In this connection, for the sake of brevity, only one roller is shown in the figure.

The sheet feeding points 401 and 402 indicate positions, such as a cassette, at which sheets are placed. The sheet discharge point 410 indicates a position at which a sheet is discharged to outside the machine. The branching points 403, 404, 406, and 407 indicate junction points of sheet conveying paths within the copying machine. The reversal position 408 indicates the leading end position of a sheet when the sheet is conveyed and switched back during double-sided printing.

The speed change point 405 indicates a point at which the conveying speed is changed upon the leading end or the trailing end of a sheet passing that point. The stop point 409 indicates a position at which the leading end of a sheet to be subjected to printing on the reverse side temporarily stops in order to adjust the time so that the sheet to be subjected to printing on the reverse side and a sheet that is fed do not collide at a time of double-sided printing.

(Point Specification GUI)

Figure 5A:
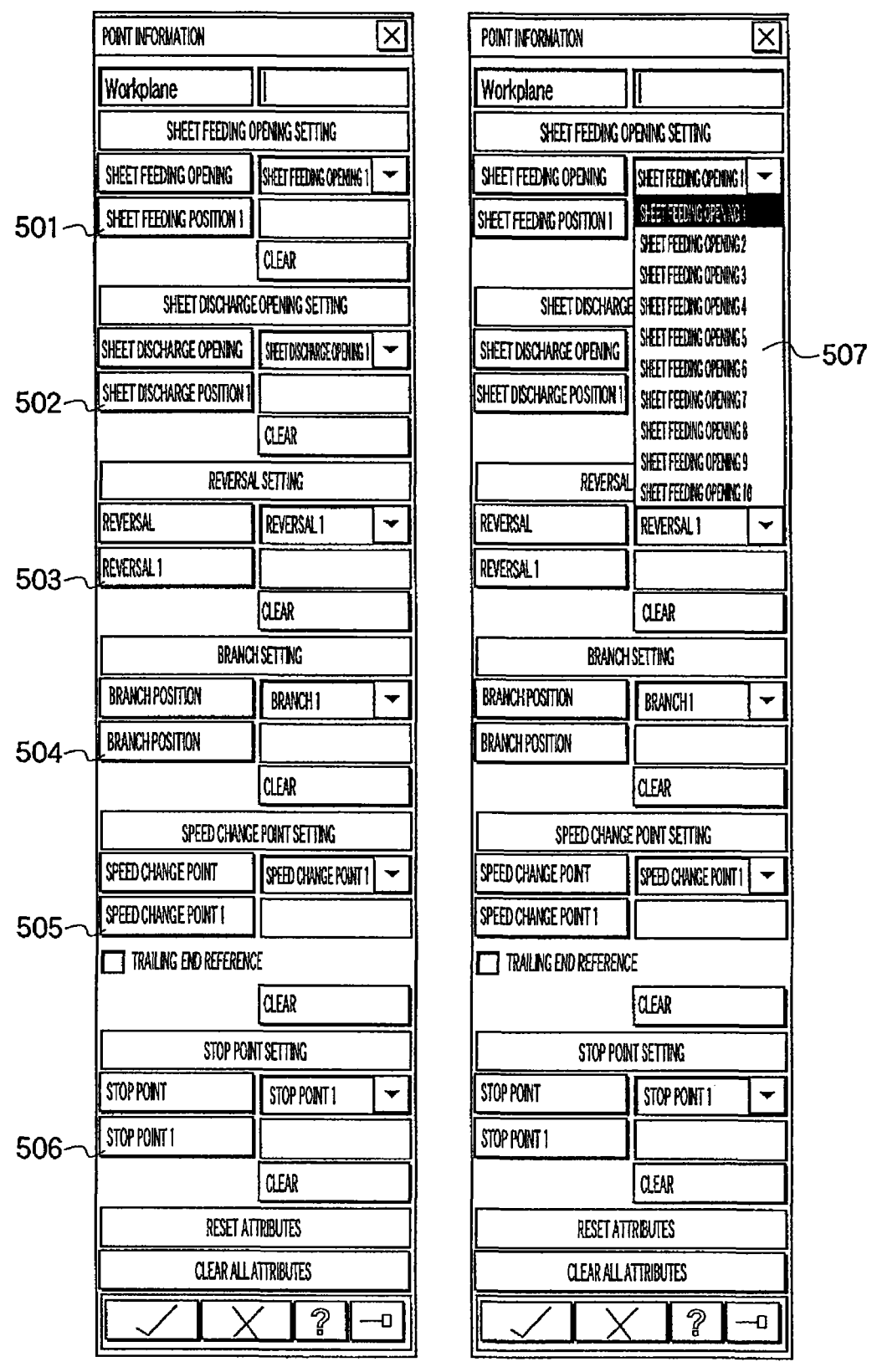

FIGS. 5A and 5B are views showing a GUI menu that a designer operates in order to specify points when adding attributes of characteristic points to a sheet conveying path at step S2. This GUI menu (see FIG. 5A) is displayed on the display 210. When selection of a sheet feeding position button 501 is detected, the design support system 100 enters a point input standby state, and when the point of the sheet feeding opening 401 is specified, the design support system 100 defines a "sheet feeding opening" position. Likewise, when a sheet discharge position button 502 is pressed, the design support system 100 enters a point input standby state, and defines a "sheet discharge opening" position upon specification of the point of the sheet discharge opening 410.

Further, when a reversal button 503 is pressed, the design support system 100 enters a point input standby state, and defines a "reversal position" upon specification of the point of the reversal position 408. When a branching position button 504 is pressed, the design support system 100 enters a point input standby state, and defines a "branching point" position upon specification of the branching point 403 or the like. When a speed change point button 505 is pressed, the design support system 100 enters a point input standby state, and defines a "speed change point" position upon input of the point of the speed change point 405. When a stop point button 506 is pressed, the design support system 100 enters a point input standby state, and defines a "stop point" position upon input of the point of the stop point 409. However, regarding the speed change point 405, since there are also cases in which the speed increases after the trailing end of a sheet passes the speed change point 405, it is necessary to set a flag regarding whether or not it is a trailing end reference.

Figure 6A:
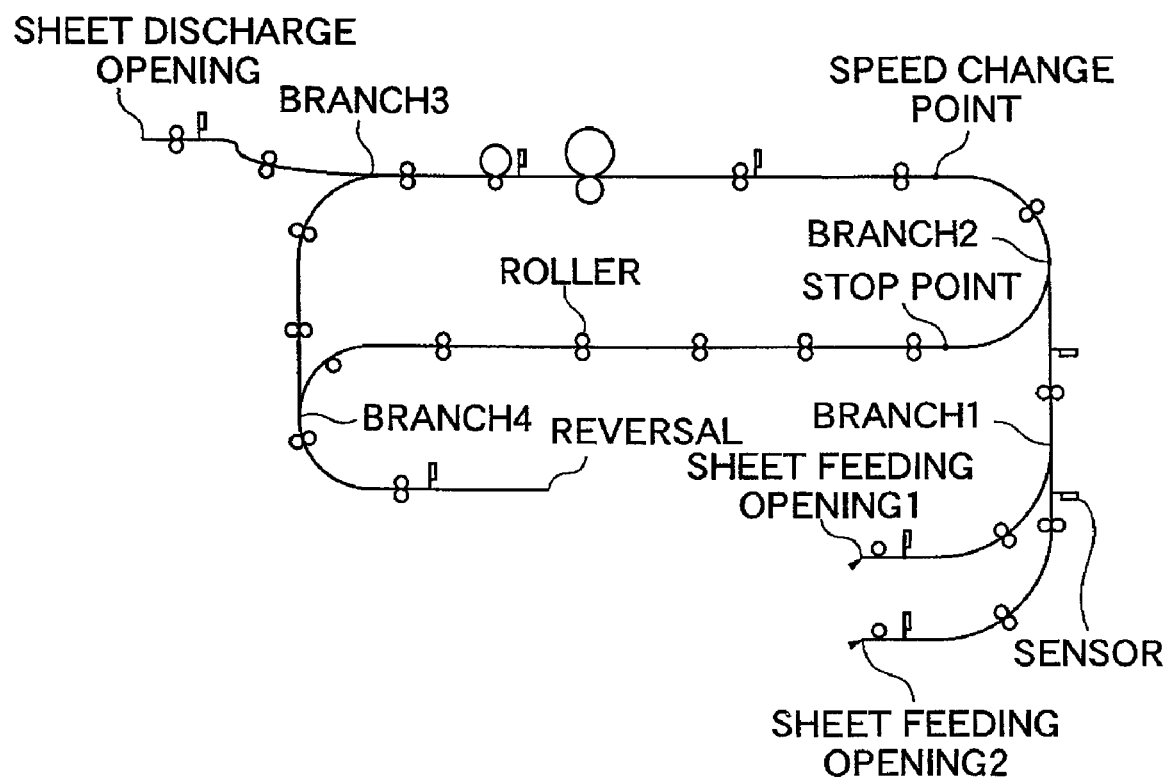
Figure 6B:
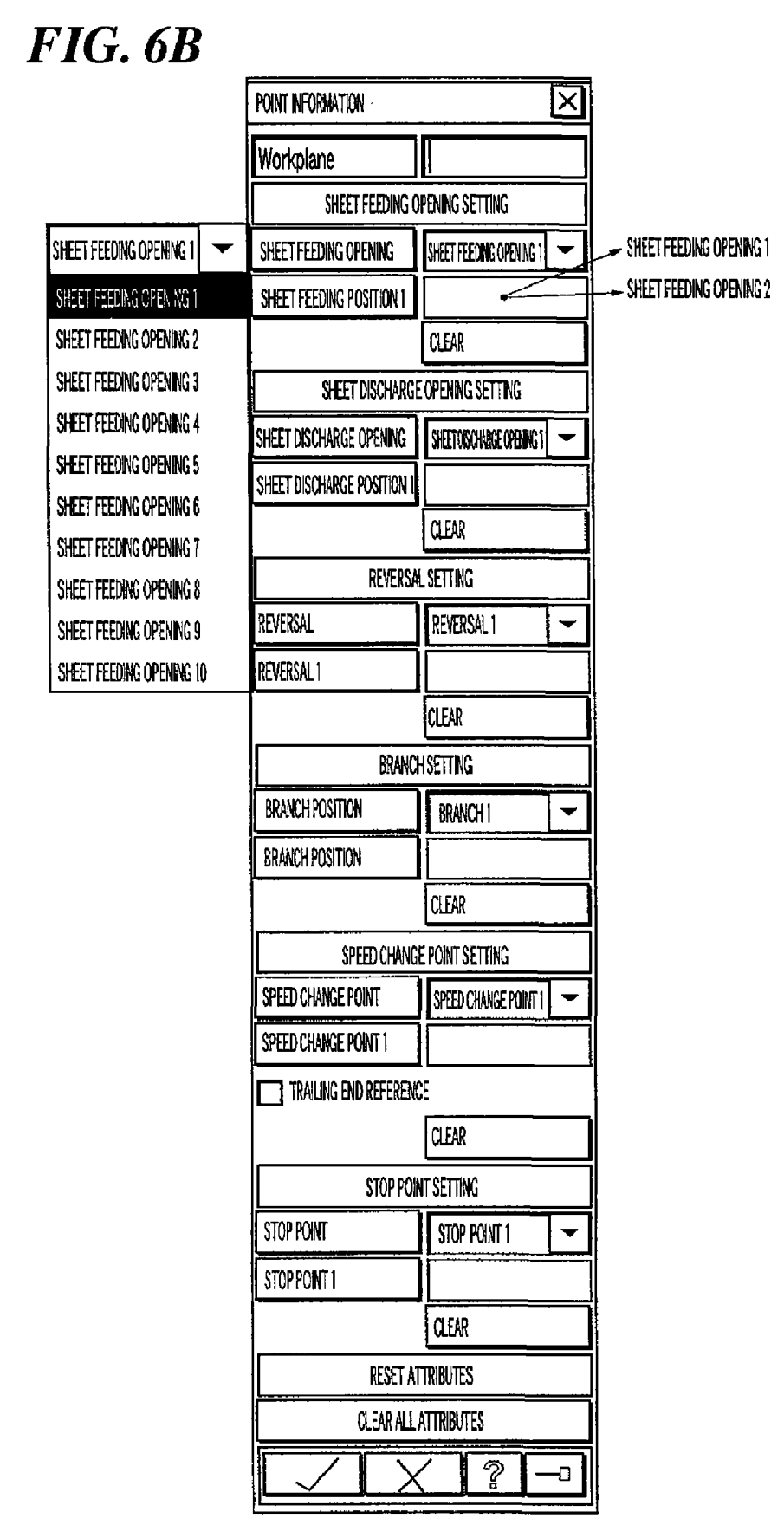

Further, in many copying machine there are a plurality of each of the "sheet feeding opening", the "sheet discharge opening", the. "reversal position", the "branching point", the "speed change point", and the "stop point". Accordingly, as shown in FIG. 5B, for example, when defining the "sheet feeding opening", the number of the sheet feeding opening can be selected with a toggle 507 and defined. FIGS. 6A and 6B are views showing sheet conveying path information 415 in which the positions of "sheet feeding openings" are defined, and a GUI menu. When there are a plurality of characteristic points, as shown by "sheet feeding opening 1" in FIG. 6B, the number of a sheet feeding opening is selected, and the peak of the sheet conveying path is specified (picked) to define the position of the "sheet feeding opening 1". In this case, since there are two sheet feeding openings that consist of a sheet feeding opening 401 and a sheet feeding opening 402, peaks of two sheet conveying paths are specified and the position of each sheet feeding opening is defined.

Figure 7:
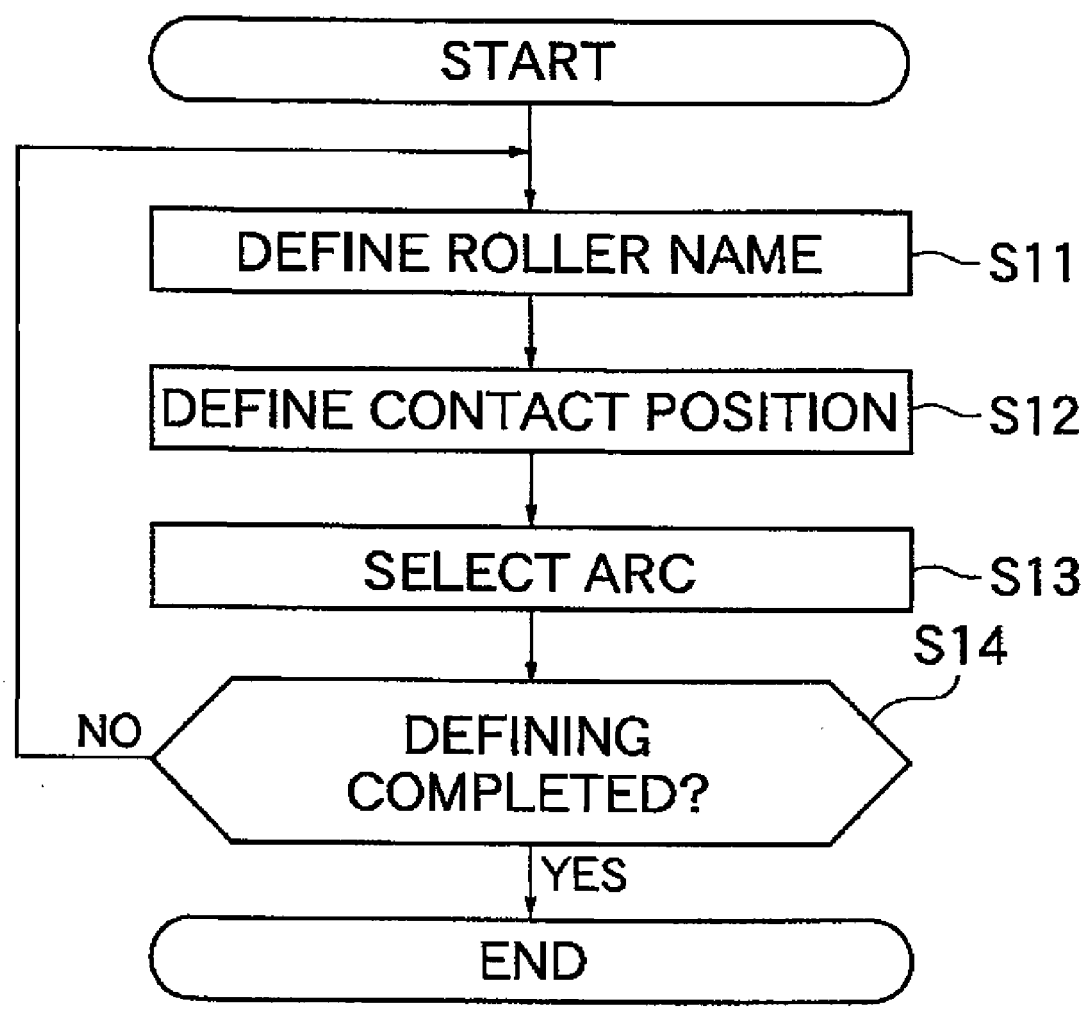
FIG. 7 is a flowchart showing the procedures of a process for adding attribute information of rollers that are on the sheet conveying path.
Figure 8:
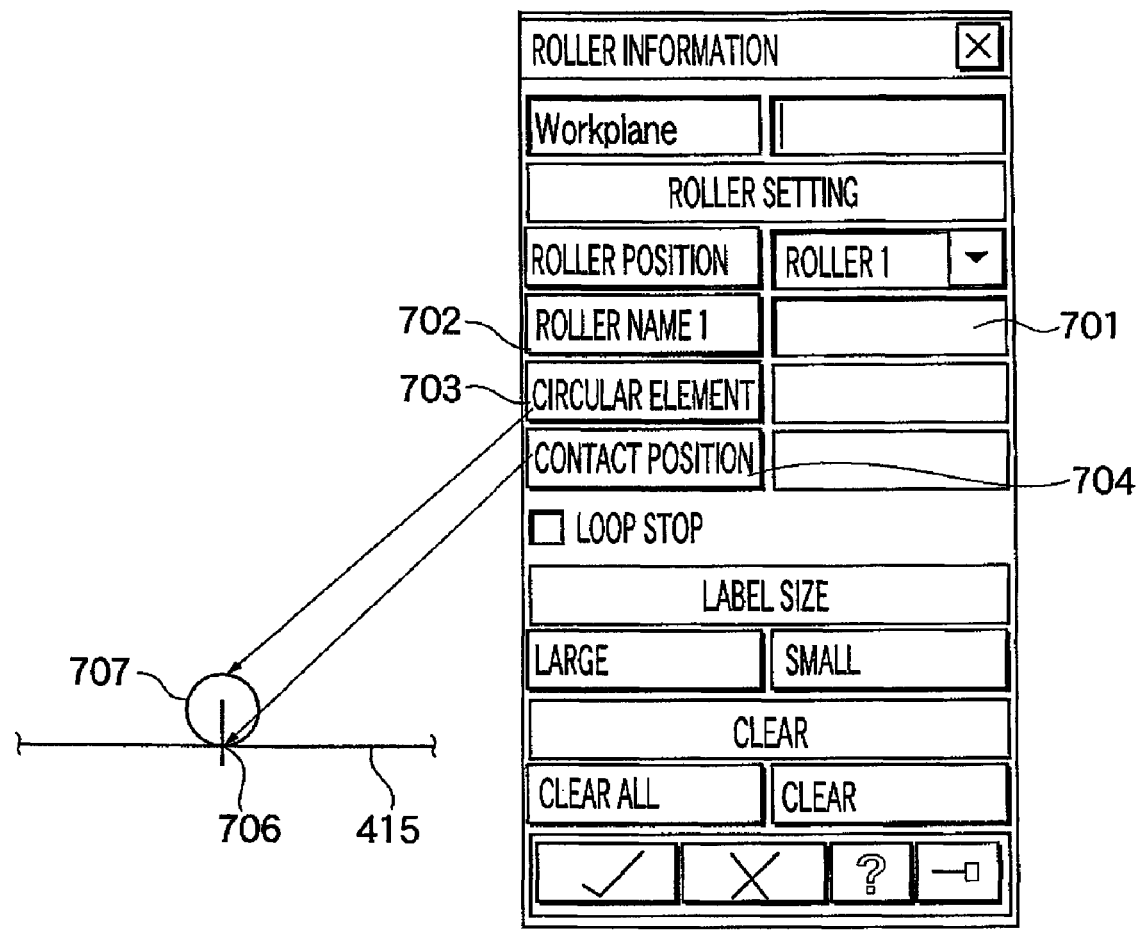
FIG. 8 is a view showing a menu screen that is displayed on a display when adding the attribute information of a roller name.

FIG. 7 is a flowchart showing the procedures of a process for adding attribute information of rollers that are on the sheet conveying path. A program for executing this process is stored on a storage medium (hard disk 211), and is executed by the CPU 201. First, the roller name is defined (step S11). FIG. 8 is a view showing a menu screen that is displayed on the display 210 when adding attribute information for a roller name. When defining the roller name, the designer presses a "roller name" button 702 on the menu screen to activate (enable) an entry field 701. Thereafter, the designer defines the roller name by specifying the name of a roller that is entered in the entry field 701.

Next, the designer defines a contact position with respect to a kick-out point of the plotted roller (step S12). At this time, the designer presses a "contact position" button 704 on the menu screen to activate (enable) the button 704, and then specifies a contact point 706 at which the roller and the sheet conveying path are in contact. By specifying the contact point 706, the contact position is defined. The contact point 706 becomes the point of contact between the sheet conveying path 415 and the roller 707.

Next, the designer defines a circular element of the roller (step S13). At this time, the designer presses a "circular element" button 703 on the menu screen to enter a state in which input is enabled, and then specifies an arc 707 that is drawn as a roller. By specifying the arc 707, the circular element of the roller is defined. The designer then confirms whether or not all of the definitions have been completed (step S14). When there is a mistake in the definitions and the definitions have to be redefined according to an input instruction of the designer, the operation returns to the process at step S11. In contrast, when the designer inputs an instruction indicating that there is no mistake in the definitions that are input and that all of the definitions are completed, the present operation is terminated.

Figure 9:
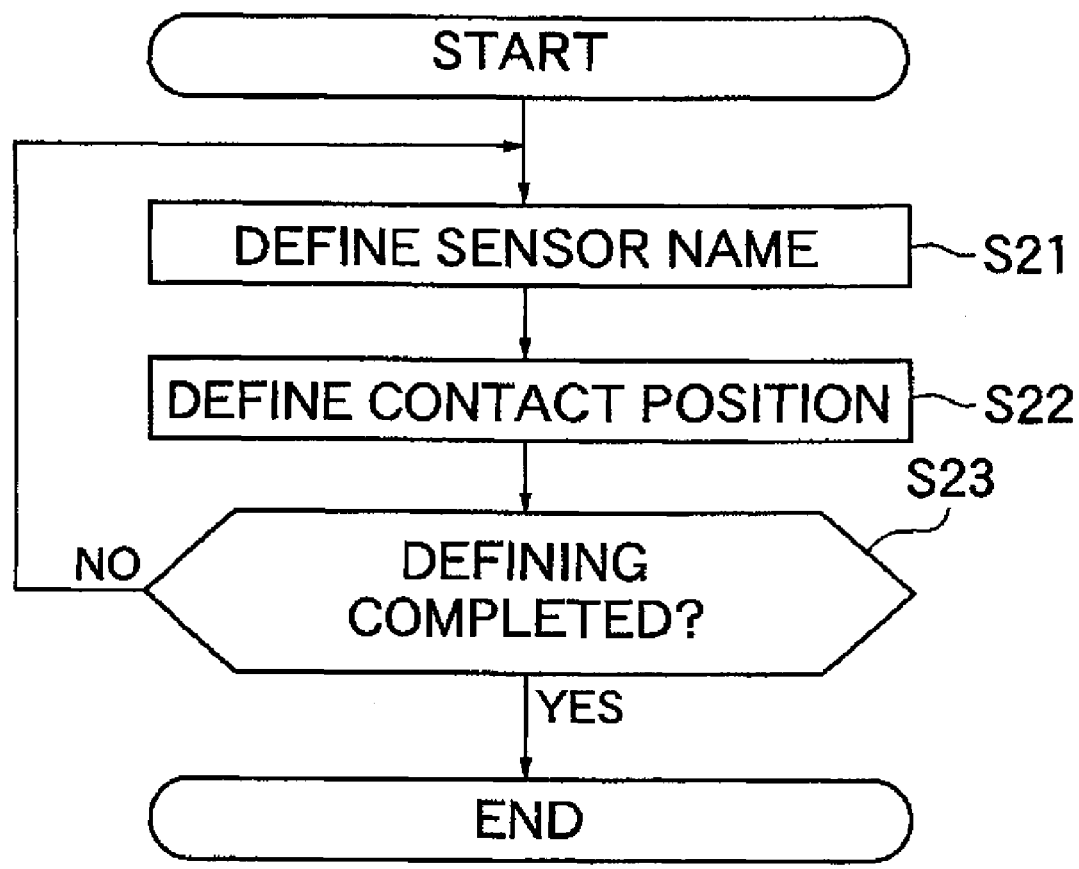
FIG. 9 is a flowchart showing the procedures of a process for adding the attribute information of a sensor.
Figure 10:
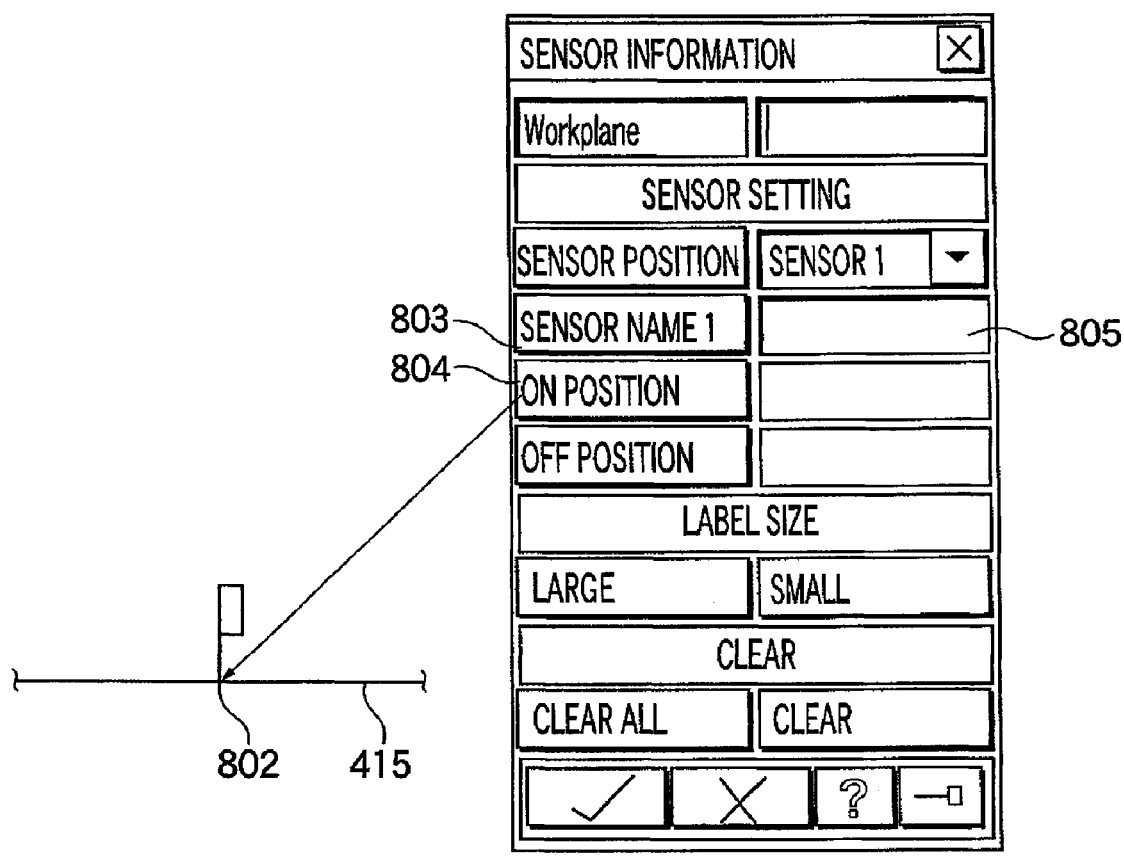
FIG. 10 is a view showing a menu screen that is displayed on a display when adding the attribute information of a sensor.

FIG. 9 is a flowchart showing the procedures of a process for adding the attribute information of a sensor. A program for executing this process is stored on a storage medium (hard disk 211), and is executed by the CPU 201. First, the designer defines the sensor name (step S21). FIG. 10 is a view showing a menu screen that is displayed on the display 210 when adding the attribute information of a sensor. The designer presses a "sensor name" button 803 on the menu screen to activate (enable) entry. Thereafter, the designer inputs a sensor name at an entry position 805. By inputting this sensor name, the sensor name is defined.

Next, the designer defines a contact point that is specified by the sensor in the sheet conveying path (step S22). The designer presses a "ON position" button 804 on the menu screen to activate (enable) entry, and then defines a sensor point 802. By specifying this sensor point 802, the contact point is defined.

The designer then determines whether or not the definitions are completed (step S23). When redefining a definition according to an input instruction from the designer in a case where the designer finds that there is a mistake in a definition as the result of checking, for example, whether or not the contact point is accurately placed on the sheet conveying path 415, the operation returns to the processing of step S21. In contrast, when the designer inputs an instruction indicating that there is no mistake in the definitions that are input and that all of the definitions are completed, the present operation is terminated.

Figure 11B:
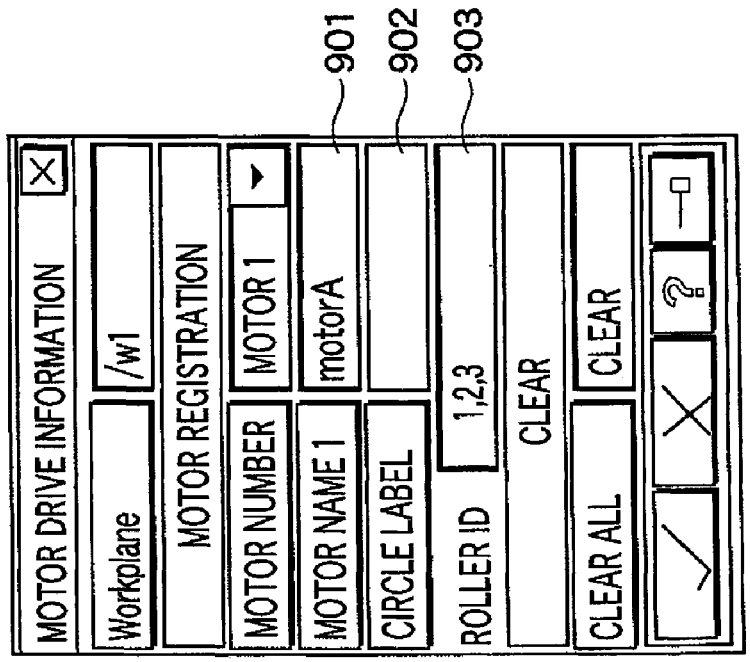
FIGS. 11A and 11B are views showing a motor drive information screen that is displayed when adding information that a roller A, a roller B, and a roller C that are disposed along a sheet conveying path are driven by the same driving source.
Figure 11A:
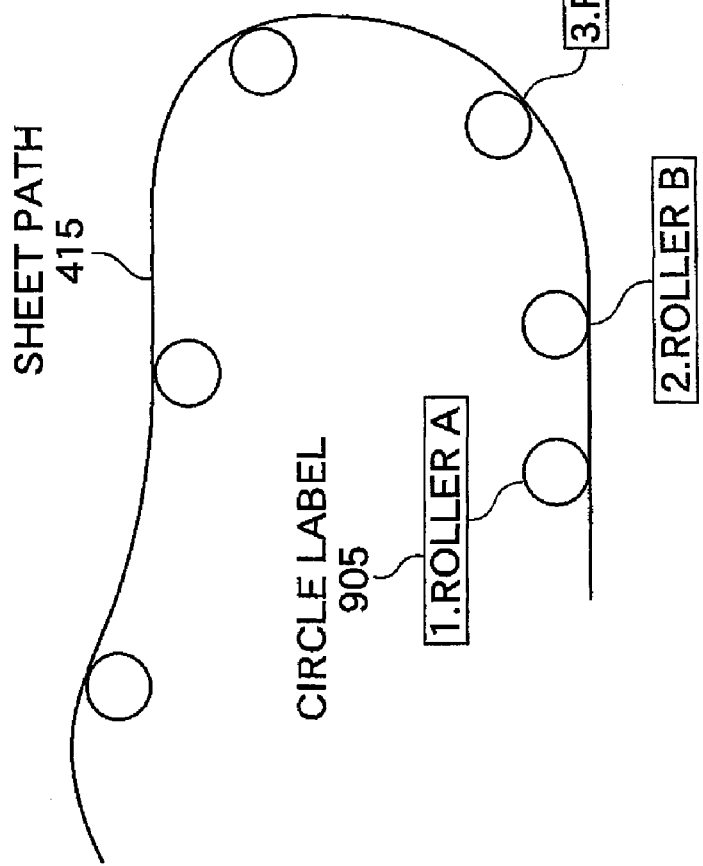

Next, processing is described that places the rollers that have been set into groups of the same driving source. FIG. 11 is a view showing a motor drive information screen that is displayed when adding information that a roller A, a roller B, and a roller C that are disposed along the sheet conveying path are driven by the same driving source. This screen is displayed on the display 210. A display section 901 is provided on the motor drive information screen. On the display section 901, when a motor 1 is selected from the motor numbers, an arbitrary motor name corresponding to motor name 1 can be input. In this case "motor A" is input.

The designer turns a button 902 on, specifies a circular label 905 that is assigned to each roller, and collects the roller IDs for each group. A numeral that is written at the start of the circular label 905 represents a roller ID_No. This number is input into the display section 903.

(Division of Sheet Conveying Path into Blocks)

Figure 12:
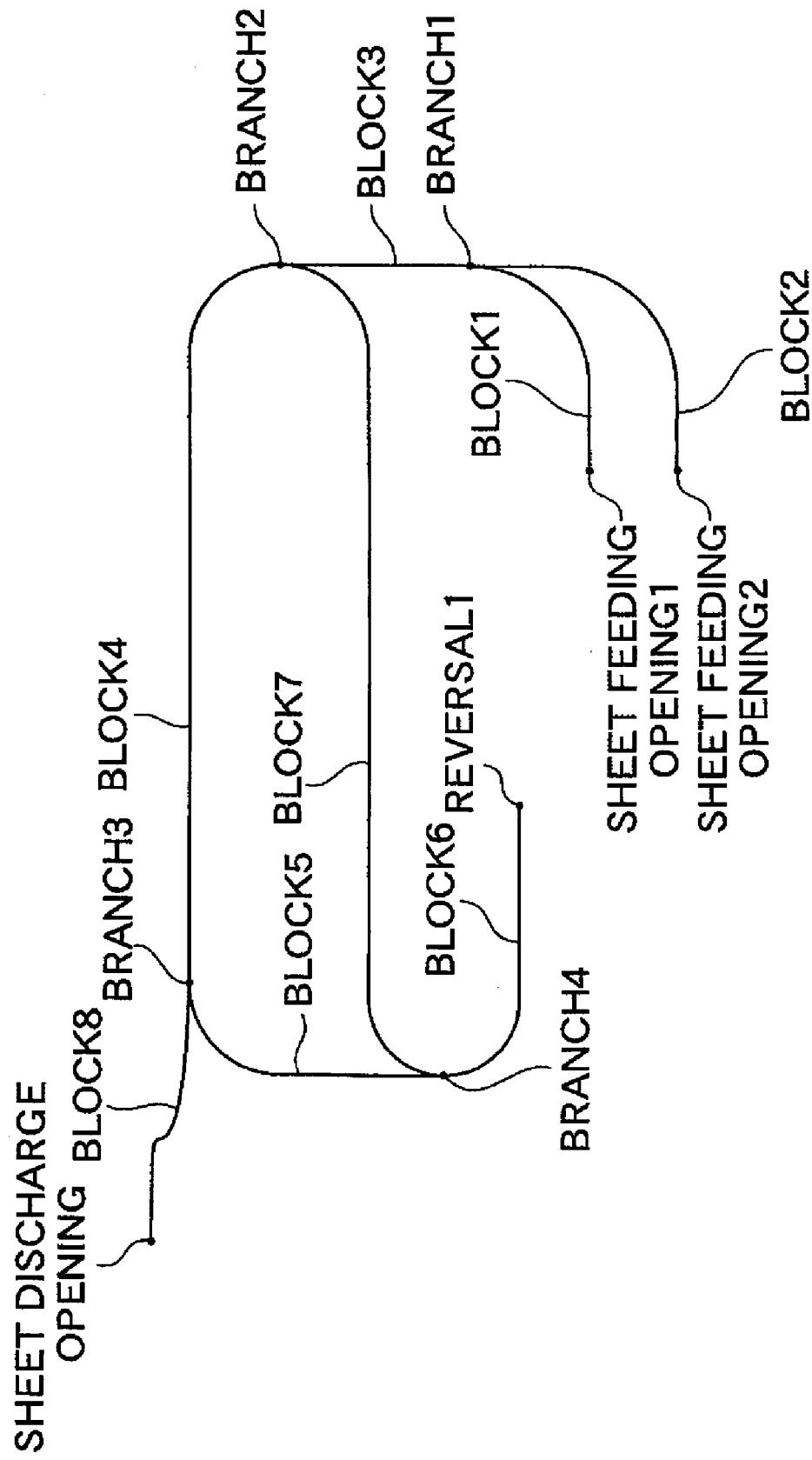
FIG. 12 is a view illustrating the division of the sheet conveying path into conveyance blocks at step S6.

FIG. 12 is a view illustrating division of the sheet conveying path into conveyance blocks at step S6. The sheet conveying path is split into blocks from a sheet feeding position to a branch position, a branch position to a branch position, a branch position to a sheet discharge opening, and a branch position to a reversal position. This block division is automatically performed on the design support system side by the provision of point information in the processing at steps S2 and S3. Further, for each of the blocks into which the sheet conveying path is divided, a label is displayed with the respective block name (Block 1 to Block n; where n is an arbitrary integer).

In FIG. 12, Block 1 denotes a division block from the sheet feeding opening 1 to a branch 1. Block 2 denotes a division block from the sheet feeding opening 2 to the branch 1. Block 3 denotes a division block from the branch 1 to a branch 2. Block 4 denotes a division block from the branch 2 to a branch 3. Block 5 denotes a division block from the branch 3 to a branch 4. Block 6 denotes a division block from the branch 4 to a reversal position 1. Block 7 denotes a division block from the branch 4 to a branch 2. Block 8 denotes a division block from the branch 3 to the sheet discharge opening.

(Finalization of Conveying Path)

FIG. 13 is a view showing a screen for setting a conveying path for one-sided printing. This screen is displayed on the display 210. On the sheet conveying path, the flow (conveying path) of a sheet in one-sided printing is shown by a thick line. This conveying path is specified in path order by the mouse 220 that is operated by the designer, and is defined with block label numbers. A display section 1102 is provided in the conveying path setting screen. Path numbers are displayed in the specified order in the display section 1102. In this case, since the path from the sheet feeding opening 1 to the sheet discharge opening is specified, Block 1→Block 3→Block 4→Block 8 are displayed as the block label numbers. More specifically, the path numbers are input with circled numbers in the display section 1102.

Figure 14A:
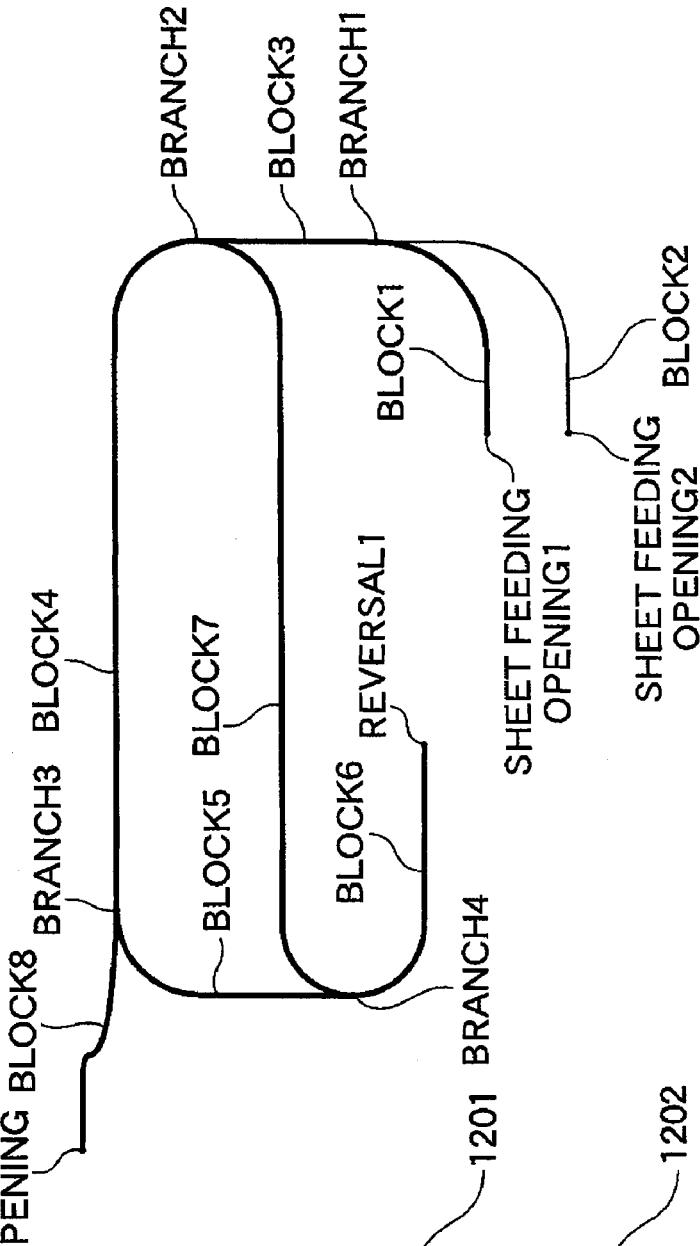
FIGS. 14A and 14B are views showing a screen for setting a conveying path for double-sided printing.
Figure 14B:
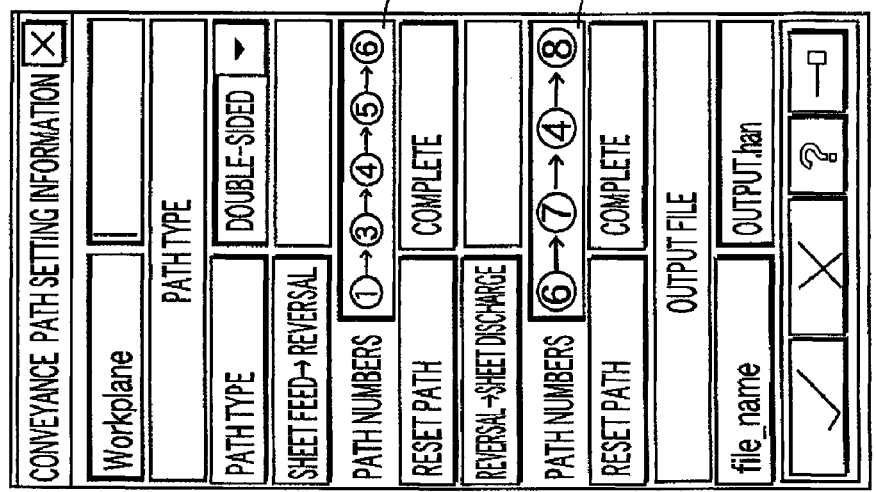

FIG. 14 is a view showing a screen for setting a conveying path for double-sided printing. On this screen, similarly to FIG. 13, the flow (conveying path) of a sheet in double-sided printing is shown by a thick line. Similarly to the case of one-sided printing, this conveying path is specified in path order by the mouse 220 that is operated by the designer, and is defined with block label numbers. In the case of double-sided printing, it is necessary to specify two conveying paths consisting of a path from the sheet feeding opening to a reversal position and a path from the reversal position to the sheet discharge opening. Since the path from the sheet feeding opening 1 to the reversal position 1 is specified in the display section 1201, Block 1→Block 3→Block 4→Block 5→Block 6 are displayed as the block label numbers. Further, since the path from the reversal position 1 to the sheet discharge opening is specified in the display section 1202, Block 6→Block 7→Block 4→Block 8 are displayed as the block label numbers (Flow of Output)

When definition of the conveying conditions of the sheet conveying path is completed, the sheet conveyance information 108 is output in file format to the design support apparatus 120. FIG. 15 is a view showing the sheet conveyance information 108 at a time of one-sided printing that is output at step S8. This sheet conveyance information 108 is divided into three blocks comprising a "point (section) information", "sheet conveying path shape information", and "roller information" as the output format, and output.

In the point (section) information, a characteristic point symbol 1, a characteristic point name 1, a section distance 1, and a leading end reference (NIL) or a trailing end reference (T) 1 are output in order. Next, a characteristic point symbol 2, a characteristic point name 2, a section distance 2, and a leading end reference (NIL) or a trailing end reference (T) 2 are output in order. Subsequently, a characteristic point symbol 3, a characteristic point name 3, a section distance 3, and a leading end reference (NIL) or a trailing end reference (T) 3 are output in order. Thereafter, output is performed in the same order.

Characteristic points include S: sheet feeding, RR: roller conveyance, RS: conveyance (passing sensor), RPF: speed change point (leading end reference), TRF: reversal position (leading end reference), and TP: temporary stop (pre-registration etc.). Other characteristic points include TL: loop stop (point at which sheet is bent and stopped), TR: reversal stop, and E: sheet discharge (leading end arrival position). Thus, there are a total of nine kinds of characteristic points.

In a case where the drive division information of rollers that are driven by the same driving source is included in the sheet conveyance information 108, the drive division information is displayed in the format RR-Group No. The drive division information RR-1 and RR-2 indicate that rollers are rotationally driven by the same motor. In the example shown in FIG. 15, since the drive division information of the sheet feeding roller and the registration roller are RR-1, it can be understood that these rollers are rotationally driven by the same motor.

In the sheet conveying path shape information, "S" or "D" is output as a flag that indicates whether the sheet conveying path is the one-sided path or double-sided path. Thereafter, the coordinates (X,Y) of the starting point and ending point of a straight line are output. This information is used when performing a final animation display that represents the state in which the sheet is being conveyed.

Roller information is information that is used when displaying the sheet conveying path and roller shapes in the final animation display. As the roller information, information regarding the center coordinates (X, Y) and the radius (R) of rollers is output one line at a time. More specifically, "X1,Y1,R1" that appears in the next line after "ROLLER" is information relating to roller 1. "X2,Y2, R2" that appears in the next line is information relating to roller 2. Further, "X3,Y3, R3" that appears in the subsequent line is information relating to roller 3. "TERM" is placed at the end.

FIG. 16 is a view showing the sheet conveyance information 108 at a time of double-sided printing. In this sheet conveyance information 108 for double-sided printing, sheet conveying path shape information is output that is divided into two paths consisting of the path from the sheet feeding opening to the reversal position, and the path from the reversal position to the sheet discharge opening. Similarly to information at the time of the aforementioned one-sided printing, the sheet conveyance information 108 is divided into three blocks comprising a "point (section) information", "sheet conveying path shape information", and "roller information" as the output format, and output. Since the information of each block is the same as that for a time of one-sided printing, a detailed description thereof is omitted here.

Figure 17:
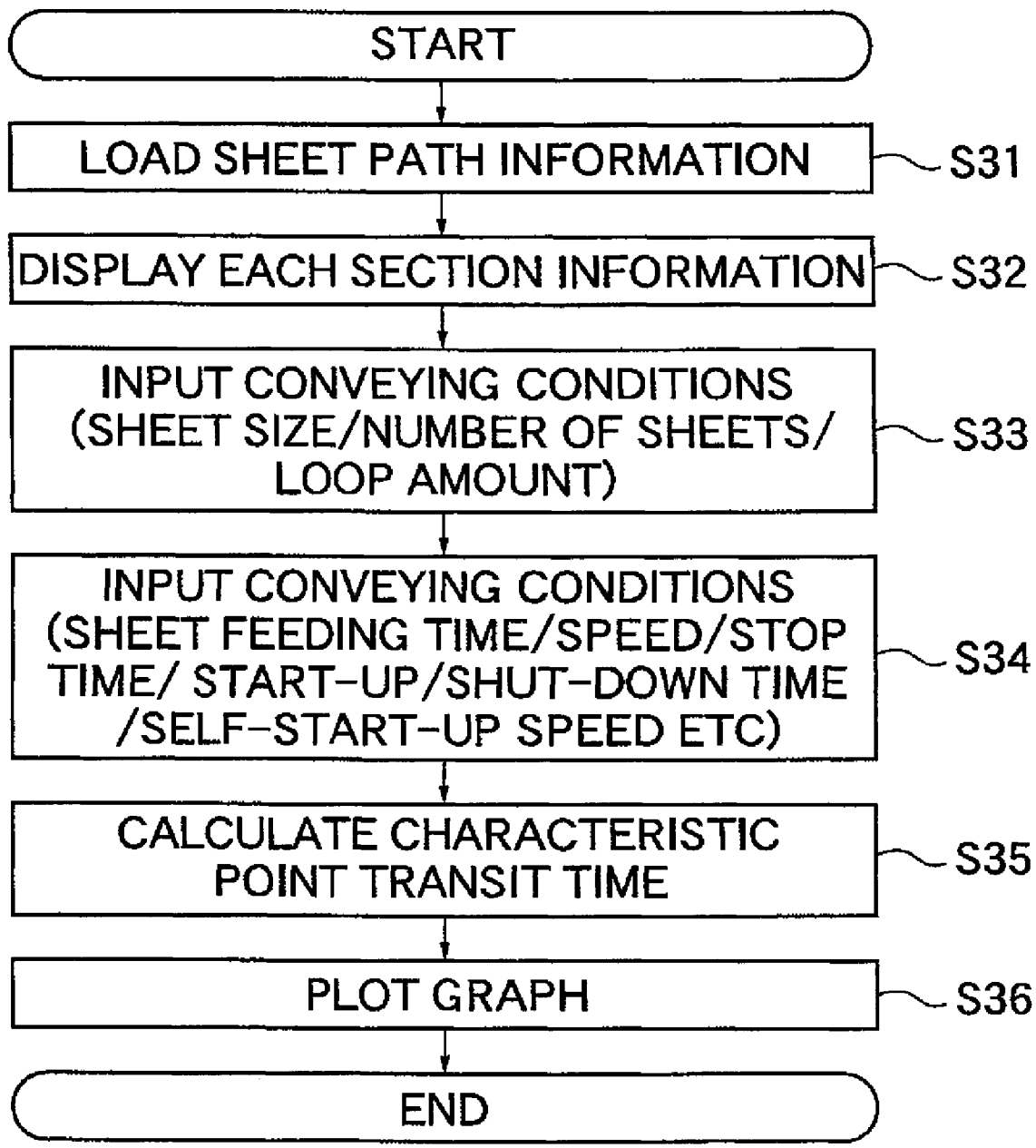
FIG. 17 is a flowchart showing the procedure of a process for creating a diagram and a timing chart.

Next, the operations of the design support apparatus 120 will be described. FIG. 17 is a flowchart showing the procedure of a process for creating a diagram and a timing chart. A program for executing this process is stored on a storage medium (hard disk 211), and executed by the CPU 201.

First, sheet conveyance 108 that is output from the mechanical system CAD apparatus 101 is loaded (step S31). Thereby, the sheet conveyance 108 is loaded into a spreadsheet tool (tabular format display section and conveying conditions input section). Based on the sheet conveyance information 108 (see FIG. 15 and FIG. 16), the CPU 201 displays distance-related information (information for each section) in a tabular format that is easy for the designer to understand on the display 210 (step S32). Based on the information regarding characteristic points, at the sheet feed, roller conveyance, conveyance (passing sensor), and speed change point, the conveying speed is displayed in a manner allowing input thereof. Further, at stopping items such as the reversal position, temporary stop, loop stop, and reversal stop, the stop time is displayed in a manner allowing input thereof.

FIG. 18 is a table that displays distance-related information. In this distance-related information table 1800, cells 1801 that indicate fields for which input is disabled are displayed in gray (with diagonal lines in the figure). In contrast, cells 1802 that indicate fields for which input is possible are shown with an outline display. The designer can input a section conveying speed, a stop time, a self-start-up (/shut-up) speed, a start-up constant, a shut-down constant and the like for the cells 1802 that are outlined. The numeric values of the cells 1801 that are displayed in grey are configured to be automatically determined and changed based on a time distance/speed relation.

The CPU 201 acquires as conveying conditions, the paper size, number of sheets and loop amount that are input by the designer (step S33). The CPU 201 also acquires as conveying conditions, the numeric values of a sheet feeding time, a speed, a stop time, start-up and shut-down times, and a self-start-up speed and the like that are input by the designer (step S34). Based on these conveying conditions the CPU 201 calculates a transit time when a sheet that is conveyed passes the characteristic points (step S35). As a result, data that is necessary for plotting a diagram and a timing chart is calculated. Based on the aforementioned calculation result, the CPU 201 displays two graphs, consisting of a diagram and a timing chart, on the display 210 (step S36).

As a result of displaying the graphs, the designer determines whether or not the operation specifications fulfill the design requirements. For example, the designer determines whether or not the number of sheets that can be discharged in one minute satisfies the specification for the necessary number of sheets, whether or not the shortest distance for a space between sheets is ensured, and whether or not the mechanical and electrical requirements are satisfied. If these requirements are not satisfied, the process is repeated at step S33 until the setting operation specification of each of the aforementioned parameters satisfies the design requirements.

(Overall Spreadsheet Tool GUI)

Figure 19A:
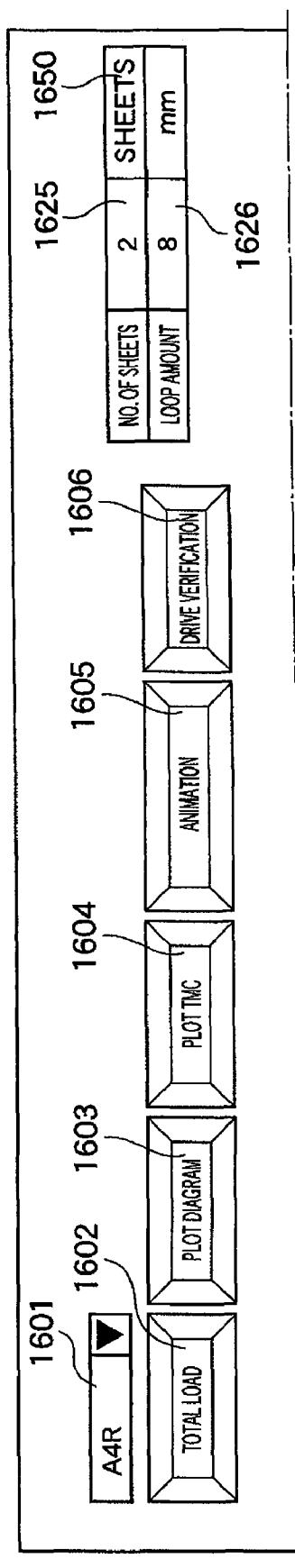

FIGS. 19A and 19B are views showing a GUI menu of the spreadsheet section 109. In this GUI menu are provided a "total load" button 1602, a "plot diagram" button 1603, a "plot TMC" button 1604, an "animation" button 1605, and a "drive verification" button 1606. The aforementioned distance-related information table 1800, a sheet conditions table 1650, and a paper size display section 1601 are also provided in the GUI menu.

Figure 20:
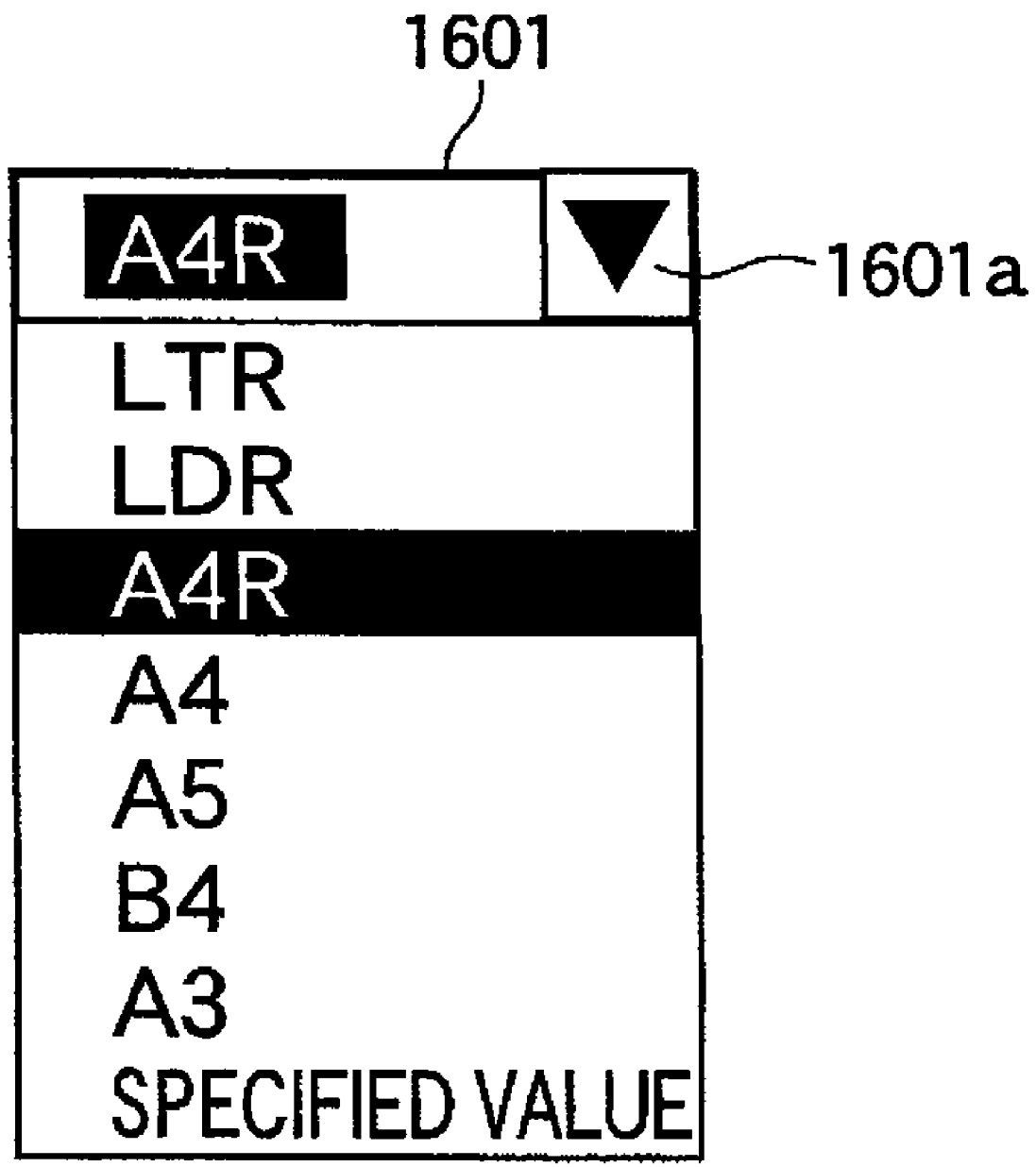
FIG. 20 is a view showing a paper size display section.

"Paper size" is displayed in the paper size display section 1601, and a paper size to be examined can be arbitrarily selected by the designer. FIG. 20 is a view showing the paper size display section 1601. On the right side of the paper size display section 1601 is provided a paper size change button 1601a in which a downward triangle is shown. When this paper size change button 1601a is selected, a list for changing the paper size is displayed. The designer can select an arbitrary paper size from the paper size display section 1601. Further, by preparing the typical paper sizes as the selection choices, the setting of conditions is facilitated. When a non-standard size (a paper size that is not previously prepared as a selection choice) is required, the designer only needs to select the "specified value" item and to input a value into the toggle.

The "total load" button 1602 is a button for reading in the sheet conveyance information 108 (see FIGS. 15 and 16) from the mechanical system CAD apparatus 101. The "plot diagram" button 1603 is a button for displaying a diagram after setting of all the parameters is completed. The "plot TMC" button 1604 is a button form displaying a timing chart.

The "animation" button 1605 is a button for starting a display using animation of a state in which sheets are conveyed with the set conveying conditions, such as conveying section speed, stop time, number of sheets, and paper size. The "drive verification" button 1606 is a button for verifying whether or not the conditions for drive division of rollers are satisfied. For example, an error is returned when there is a problem with the setting speed.

In the sheet conditions table 1650, the number of sheets to be calculated is displayed in a cell 1625. The number of sheets can be changed by inputting a specific figure in the cell 1625 (in this case, the number of sheets is set as two sheets). In a cell 1626, a loop amount that is the bending amount of a sheet that occurs when the sheet strikes against a roller in order to straighten a skew of the sheet is F displayed. When a loop stop is set in the roller information, the loop amount can be set by inputting a specific figure in the cell 1626 (in this case, 8 mm is set as the loop amount).

In the distance-related information table 1800, in a class item 1609 the names of characteristic points of the file that is read in are input in order from the start, and are input until the last section to be examined. Each characteristic point name is input into a roller sensor point item 1610. A distance item 1611 displays the total distance from the start to the characteristic points.

A section distance item 1612 displays the distance of each section. The self-start-up speed is input into a self-start-up item 1613 and the self-shut-down speed is input into a self-shut-down item 1614. The respective stabilization constants for start-up and shut-down are input into a start-up constant item 1615 and a shut-down constant item 1616. In this case, the term "stabilization constant" refers to a response time required until a roller accelerates or decelerates to a desired speed. The stabilization constant in acceleration of a motor is expressed as a start-up constant and the stabilization constant in deceleration of a motor is expressed as a shut-down constant. Further, self-start-up (self-shut-down) speed refers to a speed at a time when the motor rotates at once to a certain speed in a case where the moment of inertia of a load attached to the motor is extremely low (see FIG. 24 and FIG. 25).

In a section conveying speed item 1618, a section time item 1619, and a time item 1620 that are included in a single block as a block 1617 of "Paper 1", the respective calculated amounts for one paper sheet are represented. When the number of sheets is increased, the items of these three rows are added as a single block. That is, a section conveying speed item 1622, a section time item 1623, and a time item 1624 that are included in a block 1621 of "Paper 2" are added. A block for "Paper" is similarly added for a third and subsequent sheets.

FIG. 21 is a view showing an example in which the items "section conveying speed", "section time", and "time" are added accompanying setting of the number of sheets. In this example, a case is shown in which four sheets are set as the number of sheets. The items "section conveying speed", "section time", and "time" are added as a set for each paper sheet. Compared to the aforementioned FIG. 18, two blocks are added in FIG. 21 to display blocks for a total of four sheets (Paper 1 to Paper 4). Accordingly, by setting the speed for each of the $1^{st}$ to $4^{th}$ sheet, the designer can know the sheet feeding time for each sheet and can freely set the movement of each sheet.

(Stabilization Constant Processing Method)

Next, speed processing in a case where a start-up, a shut-down, and a self-start speed is set using the self-start-up item 1613, the self-shut-down item 1614, the start-up constant 1615, and the shut-down constant 1616 is described. A speed change is defined by an S-shaped curve, a linear curve, or a curve of an arbitrary function. In the present embodiment a case of a linear change is described.

Figure 22:
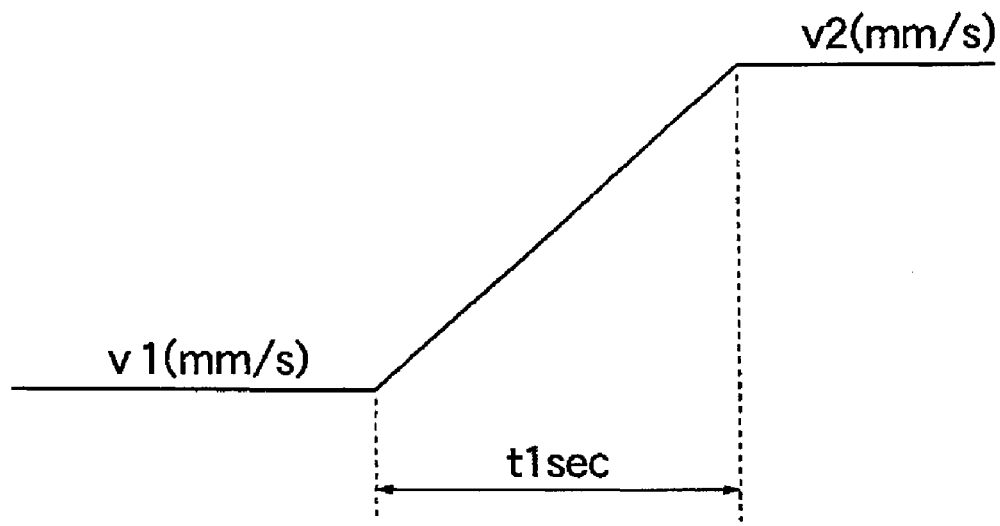
FIG. 22 is a view showing a start-up speed change from a speed v1 (mm/s) to a speed v2 (mm/s) in accordance with a value of an input start-up time t1 (sec).

FIG. 22 is a view showing a start-up speed change from a speed v1 (mm/s) to a speed v2 (mm/s) in accordance with a value of an input start-up time t1 (sec). When a start-up time t1 is input, calculation of the section time with respect to the section distance is performed while taking a speed change into account. That is, a distance d (mm) of a sheet that is conveyed in the start-up time t1 (s) is the value shown by equation (1).

$$d = t1 * (v2 + v1)/2 \qquad (1)$$

Figure 23:
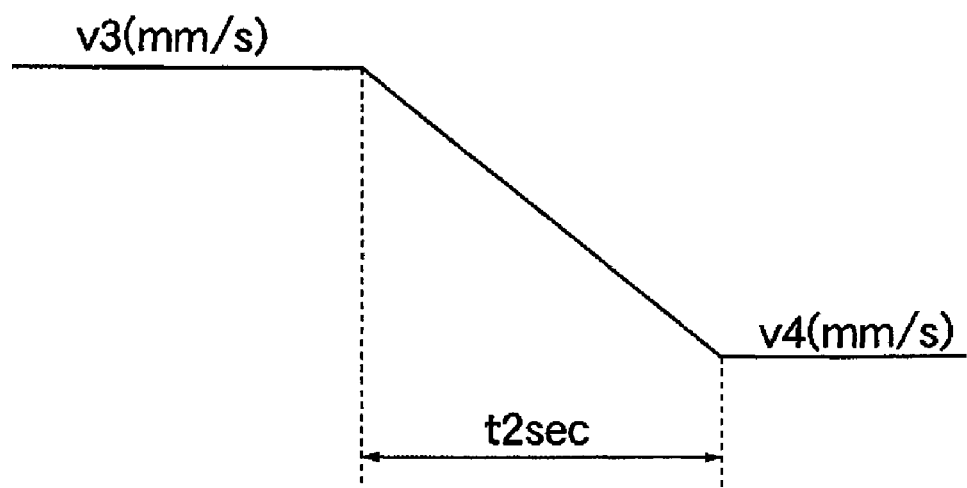
FIG. 23 is a view showing a shut-down speed change from a speed v3 (mm/s) to a speed v4 (mm/s) in accordance with a value of an input shut-down time t2 (sec).

FIG. 23 is a view showing a shut-down speed change from a speed v3 (mm/s) to a speed v4 (mm/s) in accordance with a value of an input shut-down time t2 (sec). The distance d (mm) of a sheet that is conveyed in the shut-down time t2 (s) is the value shown by equation (2).

$$d = t2 * (v3 + v4)/2 \qquad (2)$$

Figure 24:
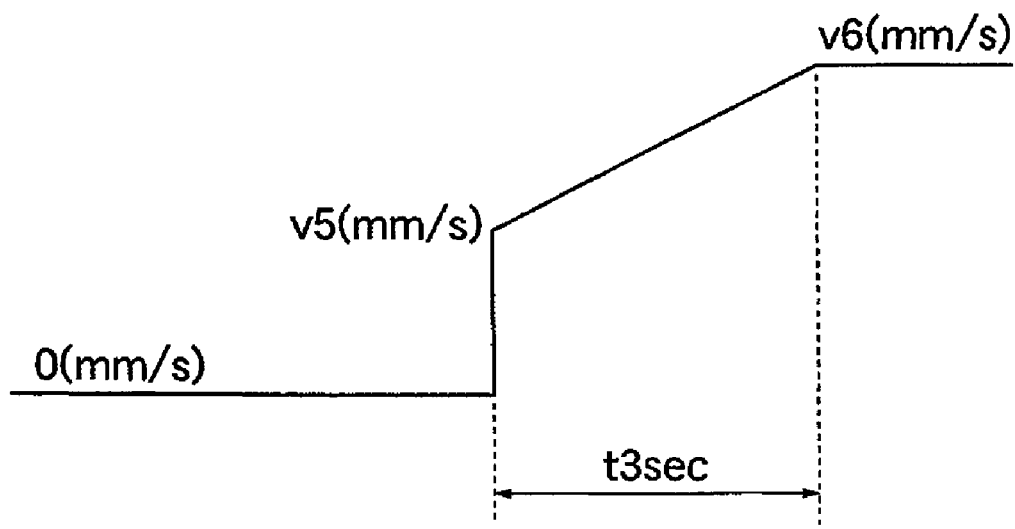
FIG. 24 is a view showing a start-up speed change from a self-start-up speed v5 (mm/s) to a speed v6 (mm/s) in accordance with a value of a start-up time t3 (sec)

Further, speed variations may also be defined based on the characteristics of the motor, taking self-start-up (self-shut-down) into account. FIG. 24 is a view showing a start-up speed change from a self-start-up speed v5 (mm/s) to a speed v6 (mm/s) in accordance with a value of a start-up time t3

(sec). The section time is calculated based on the section distance taking this kind of speed variation into account. In this case, the distance d (mm) of a sheet that is conveyed in the start-up time t3 (s) is the value shown by equation (3).

$$d=t3*(v5+(v6-v5)/2) \quad (3)$$

Figure 25:
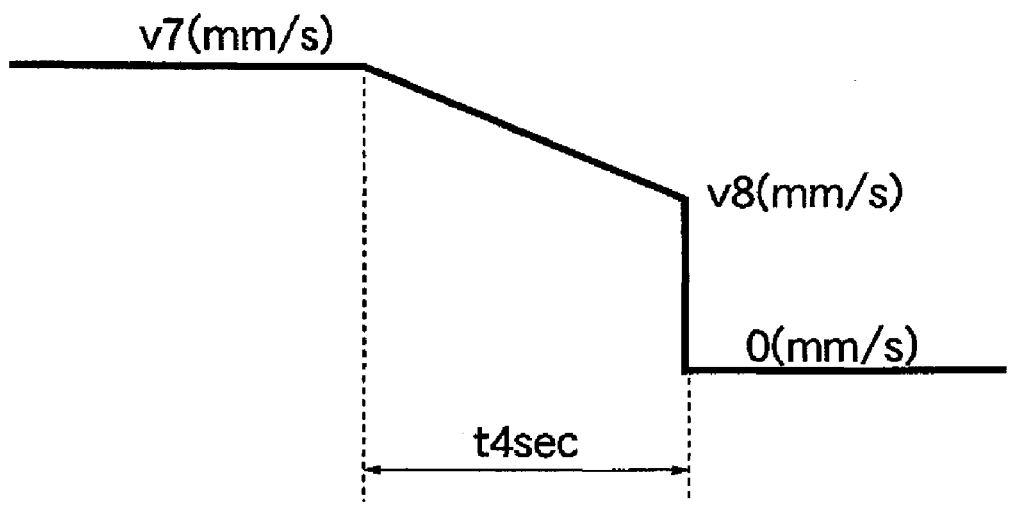
FIG. 25 is a view showing a shut-down speed change from a speed v7 (mm/s) to a self-shut-down speed v8 (mm/s) in accordance with a value of a shut-down time t4 (sec).

FIG. 25 is a view showing a shut-down speed change from a speed v7 (mm/s) to a self-shut-down speed v8 (mm/s) in accordance with a value of a shut-down time t4 (sec). In this case, the distance d (mm) of a sheet that is conveyed in the shut-down time t4 (s) is the value shown by equation (4).

$$d=t4*(v8+(v7-v8)/2) \quad (4)$$

Thus, by inputting the self-start-up (self-shut-down) speed, start-up time, and shut-down time into a table, formulas are incorporated so that the section time can be determined by taking these values into account.

(Diagram Output Example)

Figure 26:
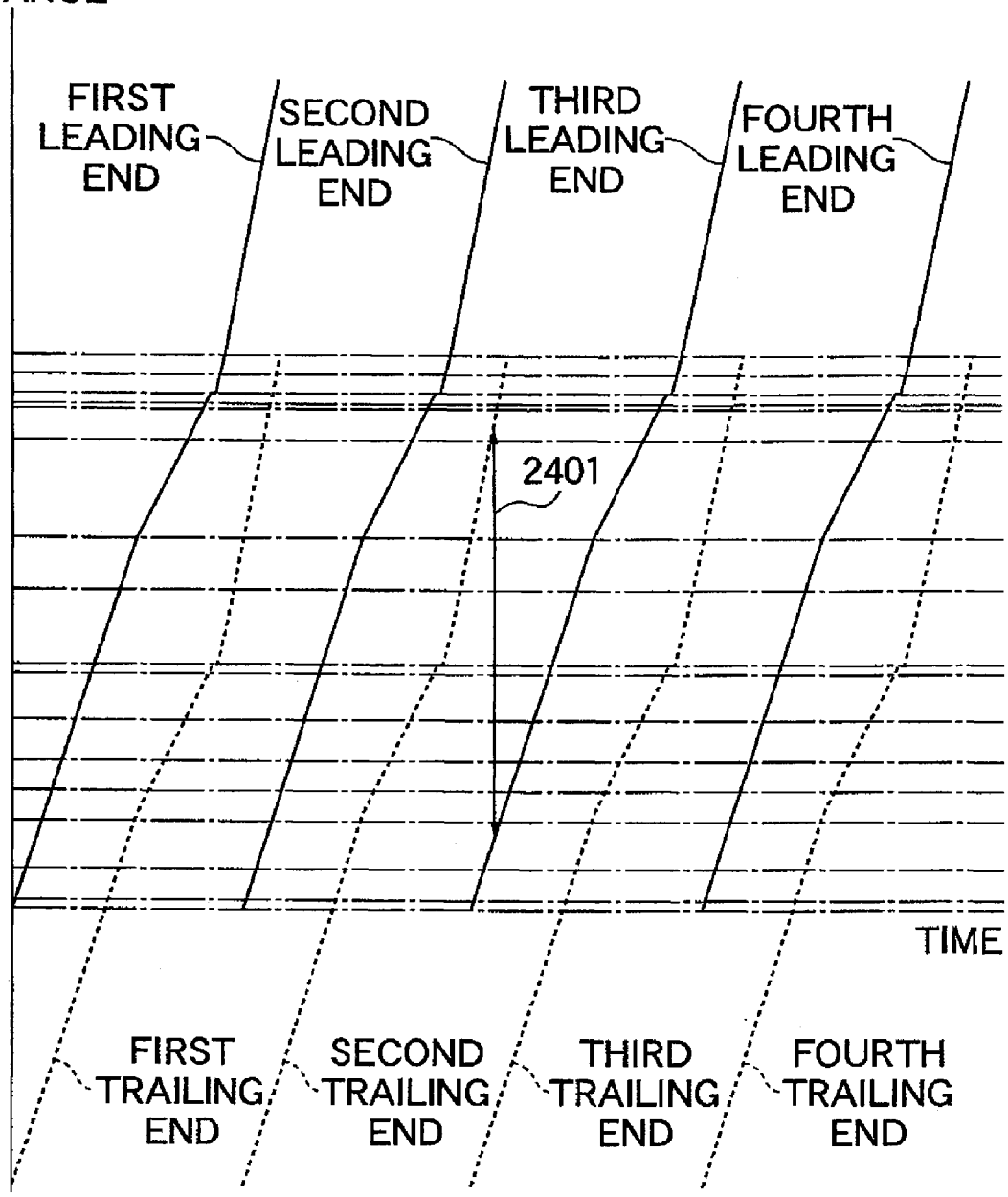
FIG. 26 is a view showing an example of output of a diagram.

FIG. 26 is a view showing an output example of a diagram. In this diagram, the conveying distances of a leading end and a trailing end of a sheet are shown with respect to the time axis. In the figure, sheet conveying is represented for a first sheet to fourth sheet. Further, a space between sheets is measured by directly measuring a distance 2401 between two points.

(Diagrammatical Representation of Stabilization Constants)

Figure 27B:
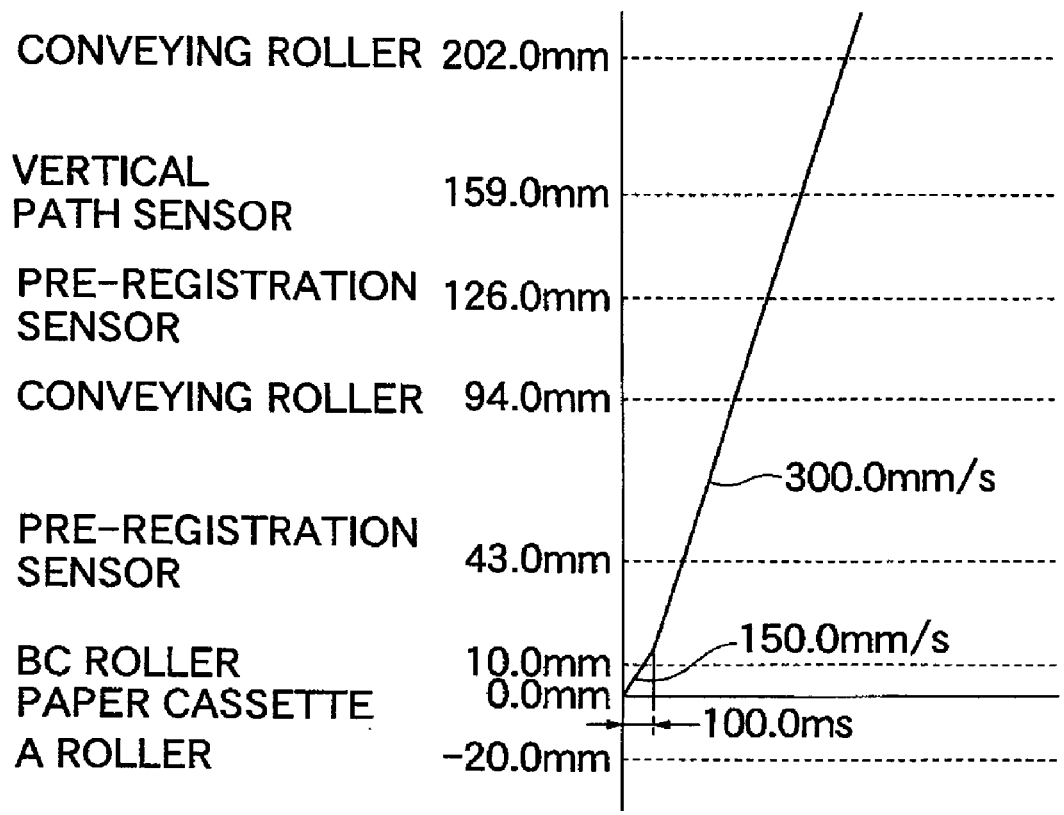
Figure 27C:
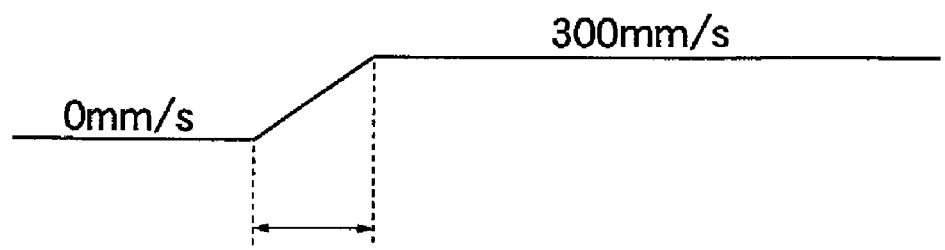

A diagram shows the manner in which the start-up, shut-down, and self-start-up (self-shut-down) speed shown in FIGS. 22 to 25 are represented. FIGS. 27A to 27C are views showing a distance-related information table, a diagram, and a timing chart in a case that incorporates a start-up constant. In the distance-related information table, a start-up time of 100 msec is defined in the cell 2501 and a final start-up speed of 300 mm/s is defined in the cell 2502 (see FIG. 27A). In the diagram, the speed of a start-up section is represented as an average value of 150.0 mm/s (see FIGS. 27B and 27C).

Figure 28B:
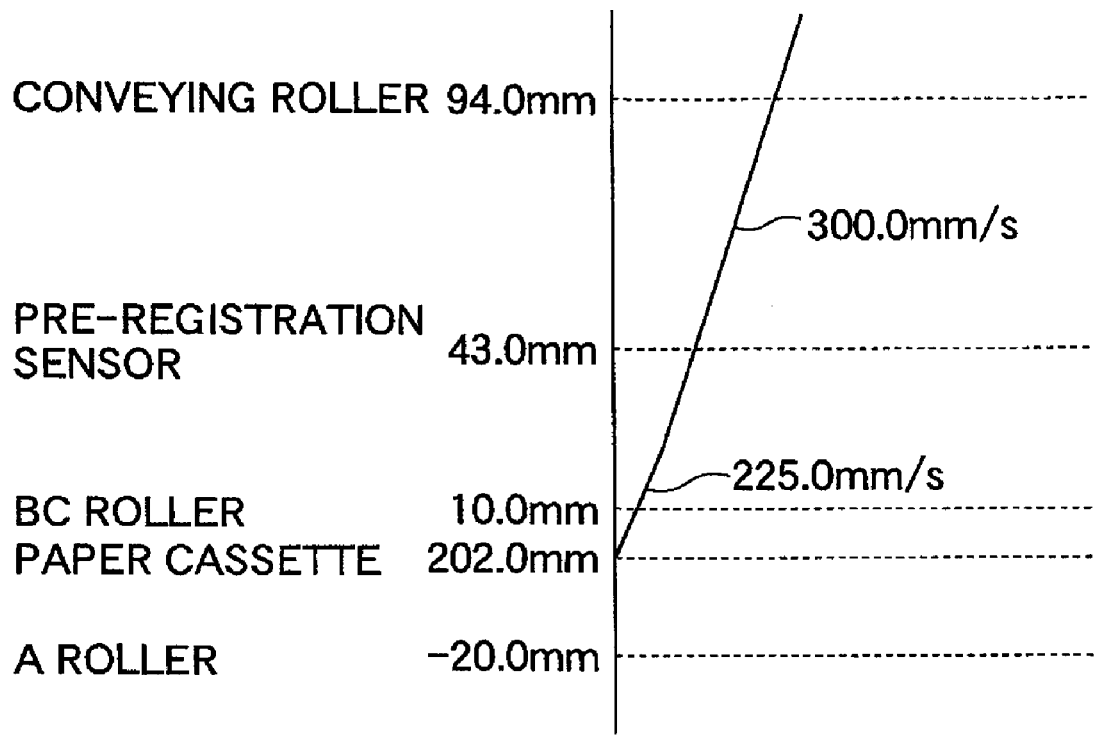
Figure 28C:
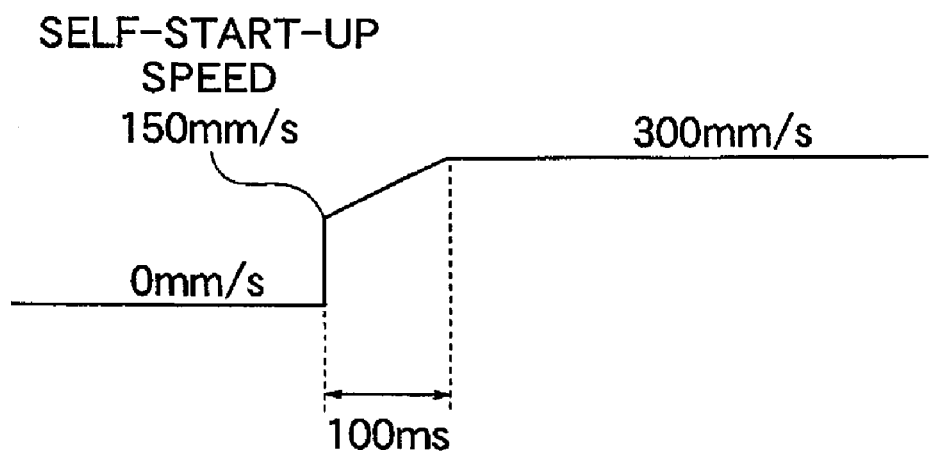

FIGS. 28A to 28C are views showing a distance-related information table, a diagram, and a timing chart in a case in which a self-start-up speed is set in addition to a start-up constant. In the cell 2601 of the distance-related information table, a self-start-up speed of 150 mm/sec is defined. In the cell 2602, a start-up time of 100 msec is defined. In the cell 2603, a final speed of 300 mm/sec is defined (see FIG. 28A). Similarly to FIGS. 27B to 27C, in the diagram the speed of a start-up section is represented as an average speed of 225.0 mm/s (see FIGS. 28B and 28C).

(Timing Chart)

Figure 29:
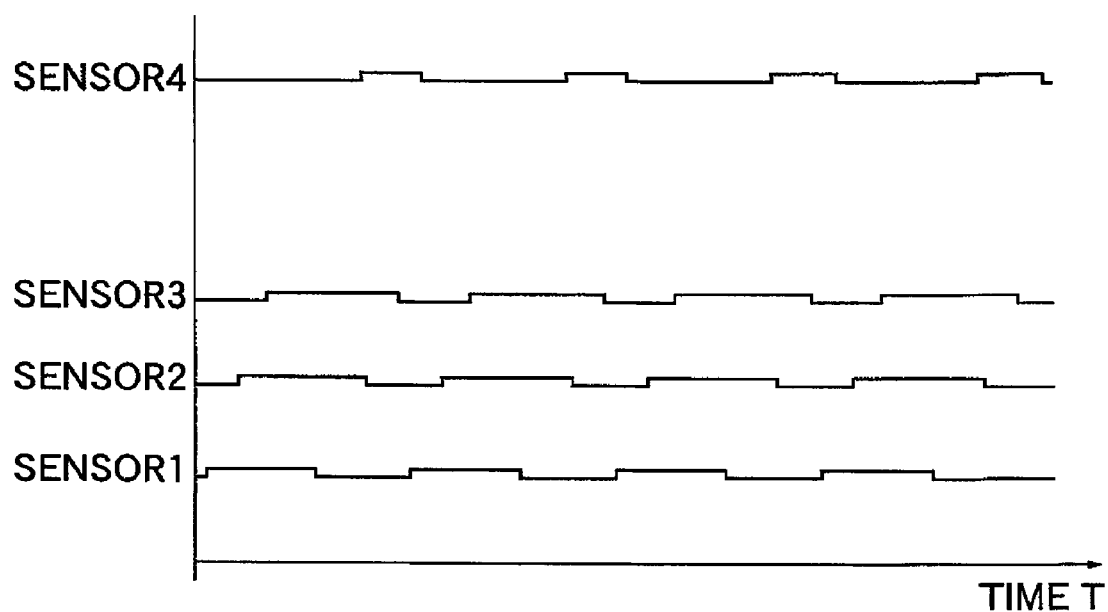
FIG. 29 is a timing chart showing temporal changes in ON/OFF operations of respective sensors.
Figure 30:
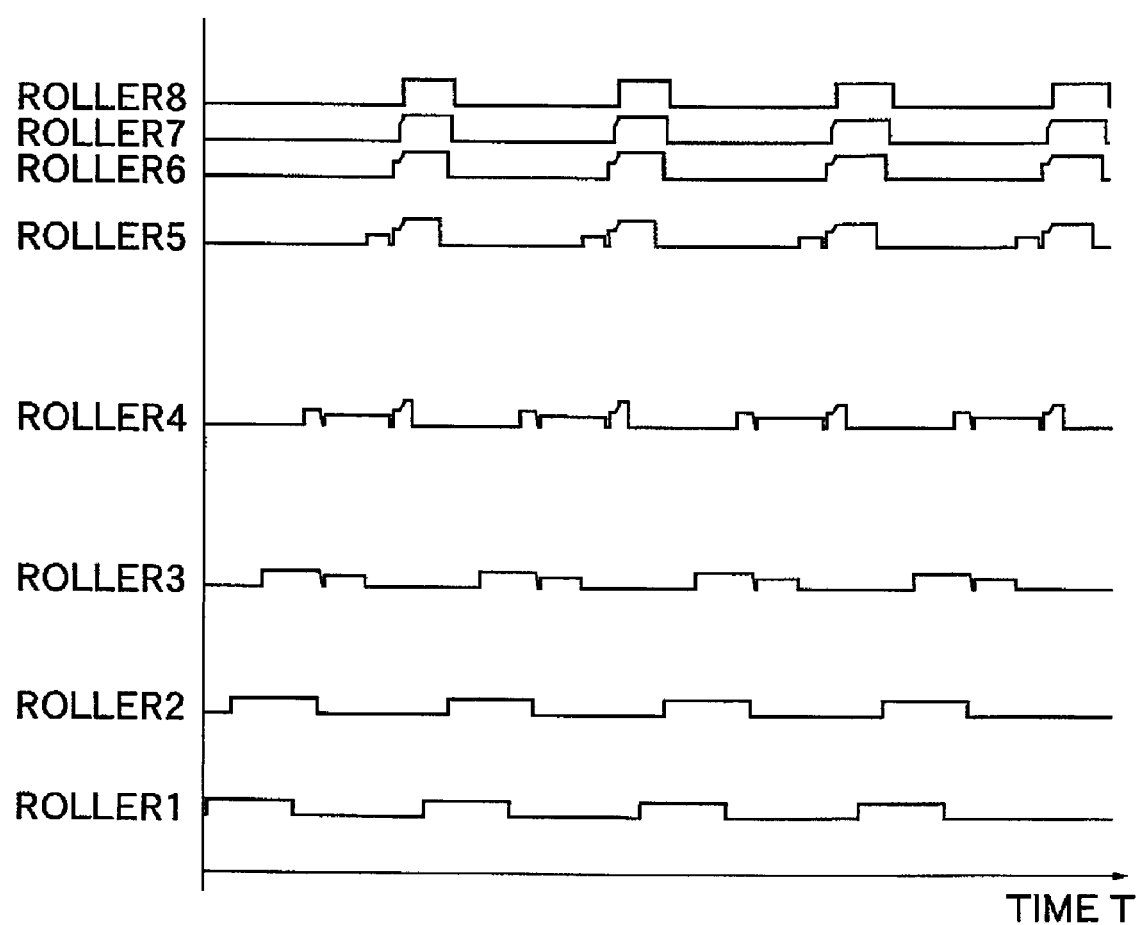
FIG. 30 is a timing chart showing temporal changes in ON/OFF operations of rollers.

FIG. 29 is a timing chart showing temporal changes in ON/OFF operations of respective sensors. In this timing chart, the ON/OFF operations of sensor that detects the passing of conveyed sheets accompanying the passage of time are plotted. FIG. 30 is a timing chart showing temporal changes in ON/OFF operations of rollers. In the case of rollers, the start-up and shut-down states are plotted in the timing chart based on the roller speed and time when a sheet passes. As a result, the designer can ascertain speed variations in the rollers.

(Drive Division Verification)

Figure 31:
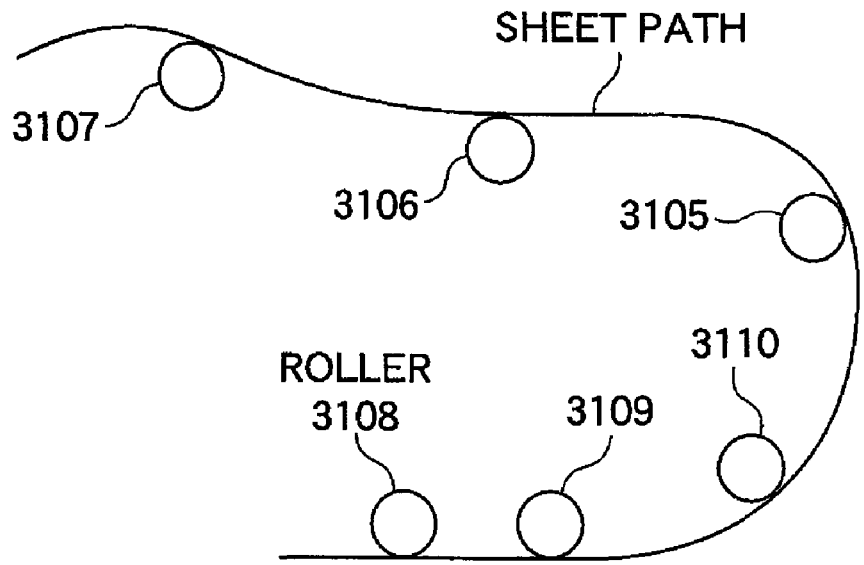
FIG. 31 is a view showing a sheet conveying path and the disposition of rollers that convey a sheet.
Figure 32:
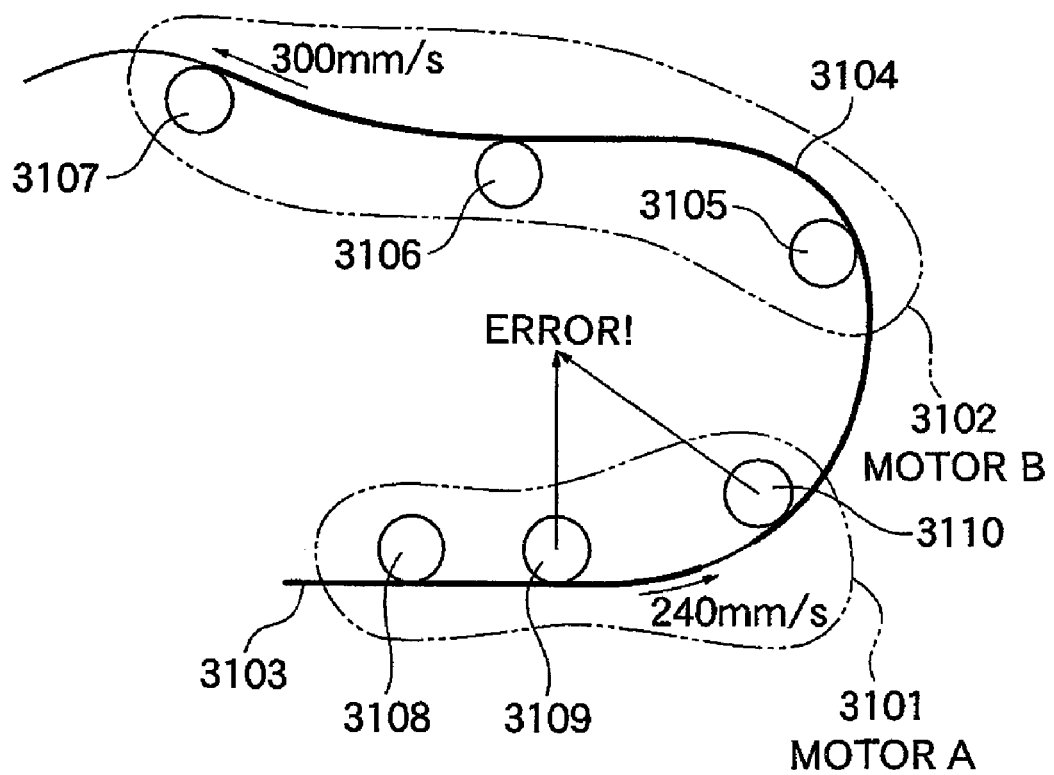
FIG. 32 is a view showing a state in which two sheets are being conveyed in the sheet conveying path shown in FIG. 31.

Drive division verification will now be described. FIG. 31 is a view showing a sheet conveying path and the disposition of rollers that convey sheets. FIG. 32 is a view showing a state in which two sheets are being conveyed in the sheet conveying path shown in FIG. 31. In this case, rollers 3108, 3109, and 3110 that are rotationally driven by a motor A are classified into an A group 3101. Further, rollers 3105, 3106, and 3107 that are rotationally driven by a motor B are classified into a B group 3102.

When the same motor is used for rollers disposed in a section of the sheet conveying path, verification is conducted based on the rule that, as long as the transmission of power is not cut by a clutch or the like, the conveying speed for the section must be constant. Further, for the A group 3101 section, the conveying simulation is performed at a conveying speed of 240 mm/s. For the B group 3102 section, the conveying simulation is performed at a conveying speed of 300 mm/s. The sheets that are conveyed are of various sizes (see FIG. 32).

Even if there is no inconsistency in the drive division for an A4-size sheet, for an A3-size sheet, for which the length of the sheet increases, there is a risk of the following kind of inconsistency occurring. Namely, even though the trailing end portion of a first sheet 3104 is still inside the A group that is being driven by the motor A, a second sheet 3103 is already conveyed by a roller in the A group.

This is because, the design specification is decided by focusing on the leading end speed or stop time of a sheet in the distance-related information table (see FIG. 18). More specifically, this is because when a roller inside a drive division is conveying a second sheet, it is not known whether or not another roller is conveying the trailing end of a first sheet.

Accordingly, verification is performed using data of a timing chart of the roller speeds (see FIG. 30). Speed evaluation is performed by grouping rollers for which the speed should be constant for each time, to thereby verify whether or not a drive division is acceptable. When there is an error at this time, the error information is fed back to the designer using the timing chart.

Figure 33:
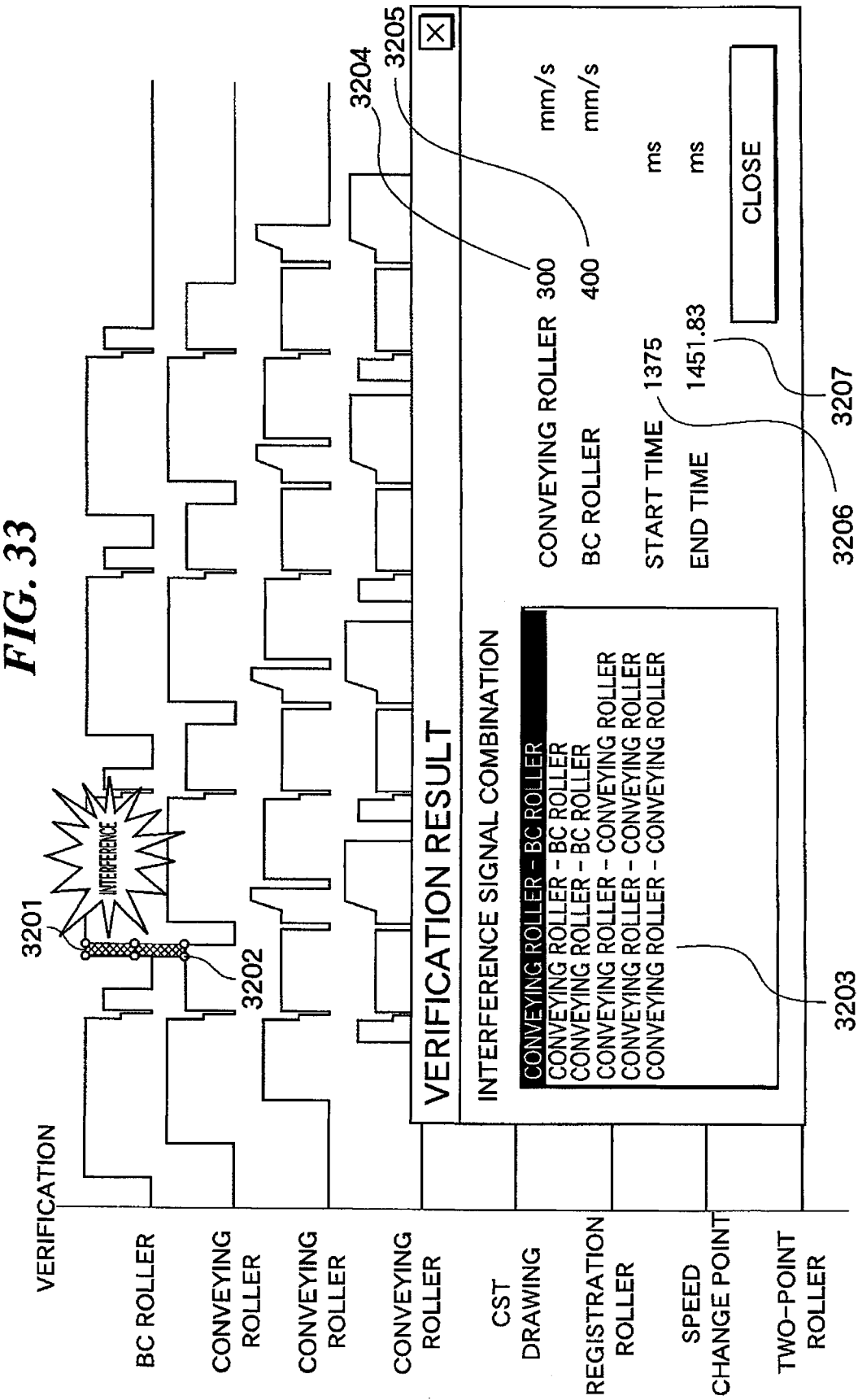
FIG. 33 is a view showing a timing chart in which error information is displayed as a result of verification, and a verification result dialog box.

FIG. 33 is a view showing a timing chart in which error information is displayed as a result of verification, and a verification result dialog box. In this timing chart, interferences occur at error sections 3201 and 3202. In this case, the design support apparatus 120 may change the color of timing chart portions of rollers in error sections to red or the like or thicken line segments to explicitly show the error locations. The design support apparatus 120 may also connect those sections with a band as necessary. Since there are cases in which several combinations of these kinds of interferences appear, the design support apparatus 120 may show the verification result in a separate dialog. A display section 3203 of this dialog displays combinations of interference signals. A combination that is the problem in this case is displayed in a list box in a format such as roller name A to roller name B. Further, each time a selection is made using the list box, a start time 3206 and an end time 3207 of the error are displayed.

When there is a drive division error, the verification result dialog box displays a conveying roller speed 3204 and a BC roller speed 3205. A design countermeasure can then be taken with respect to the error by cutting the transmission of power with a clutch or adding one motor or the like.

(Verification Process)

Figure 34:
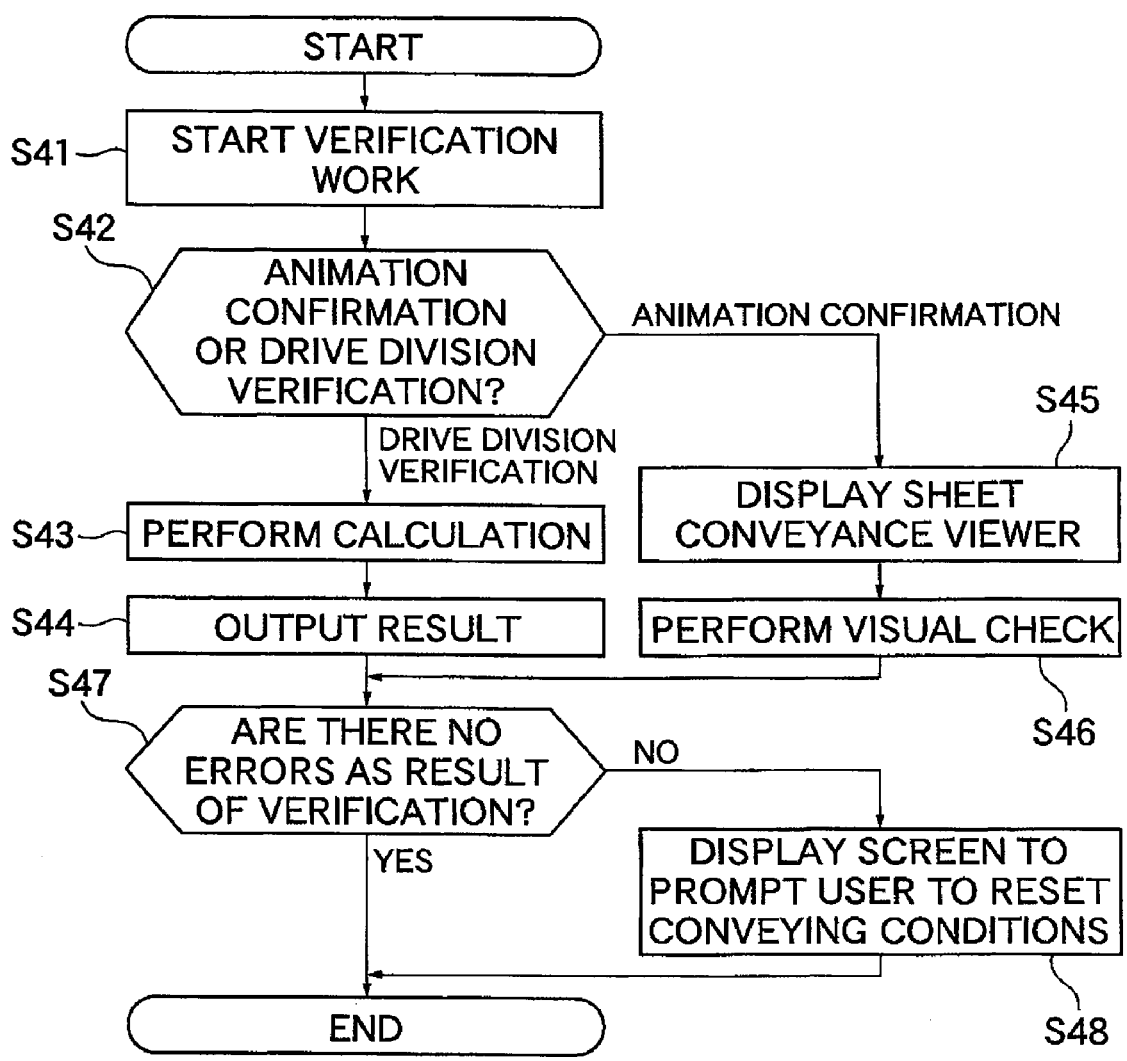
FIG. 34 is a flowchart showing the procedure of a process for verifying a design specification.

Next processing is described that verifies the design specification after completing the diagram and timing chart. FIG. 34 is a flowchart showing the procedure of a process for verifying the design specification. A program for executing this process is stored on a storage medium (hard disk 211), and executed by the CPU 201.

First, the CPU 201 starts the verification work by storing all the design values that are decided by the designer in the RAM 203 (step S41). Next, as the verification method, the CPU 201 determines whether animation confirmation or drive division verification has been selected (step S42). In this case, the animation confirmation is a method that performs a visual check by visual observation of an animation display. In contrast, the drive division verification is a method that verifies whether or not there are inconsistencies in the speed definitions of rollers while referring to drive division information of CAD data.

When the designer confirms that, for example, all speeds and stop times are input in the distance-related information table (see FIG. 18) and selects a "drive verification" button 1606, the CPU 201 performs a calculation (step S43). In this calculation, the speed for each time is compared for each of the same driving sources to search for an inconsistency such as the existence of a speed difference. When there is an inconsistency in the calculation result, the CPU 201 outputs a calculation result that includes that inconsistency (step S44).

Figure 35:
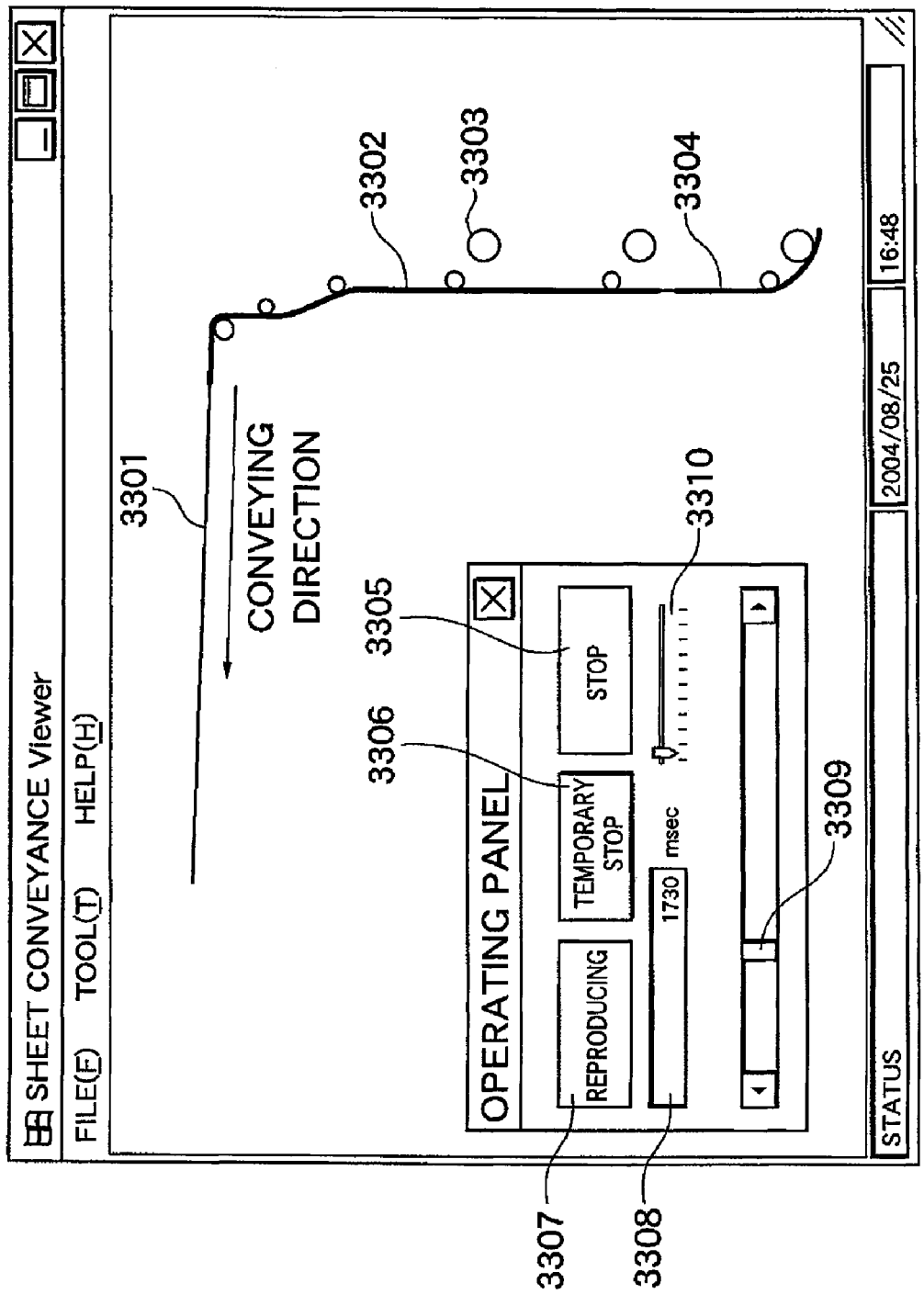
FIG. 35 is a view showing a sheet conveyance viewer.

On the other hand, when the animation confirmation is selected at step S42, the CPU 201 displays a window for displaying a sheet conveyance viewer on the screen of the display 210 (step S45). FIG. 35 is a view that illustrates the sheet conveyance viewer. The sheet conveyance viewer includes an operating panel. Upon selection of a "reproducing" button 3307, the CPU 201 displays the manner of the sheet conveyance in the window based on the operation specifications that have been input (see FIG. 18) (step S46). Thus, the designer can perform confirmation by visual observation. During reproducing, when a space between sheets shortens and there is a risk of interference occurring, the designer can select a "temporary stop" button 3306 to stop the sheet conveying and check the situation.

Further, by sliding a slide bar 3310 of the operating panel from side to side, the designer can shorten and lengthen the conveying time. A slide bar 3309 shows which portion is being displayed among the entire animation time. By sliding this slide bar 3309, the designer can perform fast forward or rewind.

A sheet conveying path 3301, a first sheet 3302, a roller 3303, and a second sheet 3304 are represented in the sheet conveyance viewer. By using confirmation by this kind of animation, the designer can visually check the sheet conveying path shape and the flow of sheets. As a result, the designer can ascertain in a sensible manner items that cannot be judged with only a tabular format or a graph, such as where is a portion at which the sheet conveying path has a tight curve (curvature). The designer can also make an appraisal in a sensible manner as to whether the conveying speed at that portion with a tight curvature is fast in comparison to the overall conveying speed and the like.

After the processing of step S44 or S46, the CPU 201 determines the existence or non-existence of errors based on the results of the verification using these verification tools (step S47). When an error does not exist, the CPU 201 ends the present verification process. In contrast, when an error exists, the CPU 201 performs a display that prompts the designer to redefine (re-set) the conveying conditions (step S48). Thereafter, the CPU 201 ends the present verification process.

Thus, according to the design support system of the present embodiment, by outputting the sheet conveyance information 108 from a mechanical system CAD to a spreadsheet tool, accurate information can be delivered immediately to study a diagram. Further, by changing distance information relating to the sheet conveying, the designer can examine a diagram in which the sheet conveying distance differs according to the paper quality. Furthermore, by simply changing the value for paper size, the designer can examine changes and modifications of the diagram.

The designer can also plot a diagram and a timing chart by defining a sheet feeding time, a conveying speed, a stop time, a start-up, a shut-down, self-start-up, or self-shut-down. Further, the designer can instantly examine the correctness of the defined design conditions. Based on the drive division conditions included in the mechanical system CAD, the designer can perform verification of drive divisions and verification of operations using an animation display.

Further, since the transit time when a flexible medium passes a characteristic point on the conveying path can be calculated based on the conveying conditions that are set, the designer can easily verify the conveying design for a flexible medium based on the design information that is input. The designer can also verify the correctness of the set conveying conditions.

It is to be understood that the present invention is not limited to the above described embodiment, and various variations thereof may be possible without departing from the spirit of the present invention.

For example, in the above described example, the 3-D CAD apparatus 101 and the design support apparatus 120 that comprise the design support system may be an integrated information processing apparatus. Further, a configuration may be adopted in which these comprise separate information processing apparatuses and the sheet conveyance information 108 is sent and received using a network or the like.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the medium.

In this case, the program code itself read from the storage medium realizes the functions of the embodiment described above, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, and a CD-RW. An optical disk such as a DVD-ROM, a DVD-RAM, a DVD-RW, and a DVD+RW, a magnetic tape, a non-volatile memory card, a ROM and the like can also be used. Alternatively, the program code may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code. The present invention also includes the case in which the functions of the above described embodiment are realized by such processing.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2006-122381 filed Apr. 26, 2006, which is hereby incorporated by reference herein in its entirety.

What is claimed is:

1. A design support apparatus adapted to verify a design for conveying a flexible medium based on design information relating to a conveying path, the design support apparatus comprising:
a setting unit adapted to set conveying conditions;
a transit time calculating unit adapted to calculate a transit time when the flexible medium passes a characteristic point on the conveying path based the conveying conditions that are set;
a computing unit adapted to compute a moving distance of a leading end and a trailing end of the flexible medium that is conveyed based on the transit time that is calculated; and
a diagram creating unit adapted to create a diagram that represents changes with time in the moving distance that is computed.

2. A design support apparatus adapted to verify a design for conveying a flexible medium based on design information relating to a conveying path, the design support apparatus comprising:
a setting unit adapted to set conveying conditions;
a transit time calculating unit adapted to calculate a transit time when the flexible medium passes a characteristic point on the conveying path based the conveying conditions that are set; and
a timing chart creating unit adapted to create, based on the transit time that is calculated, a timing chart that represents speed variations in a roller that conveys the flexible medium and a timing chart that represents ON/OFF operations of a sensor that detects transit of the flexible medium.

3. The design support apparatus according to claim 1, further comprising an animation plotting unit adapted to plot an animation that represents conveying of the flexible medium based on the transit time that is calculated.

4. A design support apparatus adapted to verify a design for conveying a flexible medium based on design information relating to a conveying path, the design support apparatus comprising:
a setting unit adapted to set conveying conditions;
a transit time calculating unit adapted to calculate a transit time when the flexible medium passes a characteristic point on the conveying path based the conveying conditions that are set;
a group selecting unit adapted to select a group to which a plurality of rollers that are driven by a common driving source and convey the flexible medium belong;
a comparing unit adapted to compare driving conditions of the plurality of rollers that belong to the group that is selected;
a determining unit adapted to determine whether or not an inconsistency exists in driving conditions of the plurality of rollers at the same time based on a result of the comparison; and
a warning unit adapted to perform a warning when the determination result indicates that the inconsistency exists.

5. A design support apparatus adapted to verify a design for conveying a flexible medium based on design information relating to a conveying path, the design support apparatus comprising:
a setting unit adapted to set conveying conditions; and
a transit time calculating unit adapted to calculate a transit time when the flexible medium passes a characteristic point on the conveying path based the conveying conditions that are set,
wherein the design information includes a section distance between the characteristic points, a geometrical shape of the conveying path, and roller drive division information for grouping a plurality of rollers that convey the flexible medium with respect to each driving source, and
wherein the conveying conditions include a sheet feeding time of the conveying path, a section speed, a stop time, a start-up time, and a shut-down time of the roller.

6. The design support apparatus according to claim 1, wherein the design information is input from a CAD apparatus.

7. A design support method that verifies a design for conveying a flexible medium based on design information relating to a conveying path in a design support apparatus, the method comprising:
a setting step of setting conveying conditions;
a transit time calculating step of calculating a transit time when the flexible medium passes a characteristic point on the conveying path based the conveying conditions that are set;
a computing step of computing a moving distance of a leading end and a trailing end of the flexible medium that is conveyed based on the transit time that is calculated; and
a diagram creating step of creating a diagram that represents changes with time in the moving distance that is computed,
wherein the setting step, the transit time calculating step, the computing step, and the diagram creating step are carried out by the design support apparatus.

8. A non-transitory computer-readable storage medium that stores a program executable by a computer to implement a design support method that verifies a design for conveying a flexible medium based on the design information relating to a conveying path, the design support method comprising:
a setting step of setting conveying conditions;
a transit time calculating step of calculating a transit time when the flexible medium passes a characteristic point on the conveying path based the conveying conditions that are set;
a computing step of computing a moving distance of a leading end and a trailing end of the flexible medium that is conveyed based on the transit time that is calculated; and
a diagram creating step of creating a diagram that represents changes with time in the moving distance that is computed.

9. A design support method that verifies a design for conveying a flexible medium based on the design information relating to a conveying path in a design support apparatus, the method comprising:
a setting step of setting conveying conditions;
a transit time calculating step of calculating a transit time when the flexible medium passes a characteristic point on the conveying path based the conveying conditions that are set; and
a timing chart creating step of creating, based on the transit time that is calculated, a timing chart that represents speed variations in a roller that conveys the flexible medium and a timing chart that represents ON/OFF operations of a sensor that detects transit of the flexible medium, wherein the setting step, the transit time calculating step, the timing chart creating step are carried out by the design support apparatus.

10. A non-transitory computer-readable storage medium that stores a program executable by a computer to implement a design support method that verifies a design for conveying a flexible medium based on the design information relating to a conveying path, the design support method comprising:
- a setting step of setting conveying conditions;
- a transit time calculating step of calculating a transit time when the flexible medium passes a characteristic point on the conveying path based the conveying conditions that are set; and
- a timing chart creating step of creating, based on the transit time that is calculated, a timing chart that represents speed variations in a roller that conveys the flexible medium and a timing chart that represents ON/OFF operations of a sensor that detects transit of the flexible medium.

11. A design support method that verifies a design for conveying a flexible medium based on the design information relating to a conveying path, the method comprising:
- a setting step of setting conveying conditions;
- a transit time calculating step of calculating a transit time when the flexible medium passes a characteristic point on the conveying path based the conveying conditions that are set;
- a group selecting step of selecting a group to which a plurality of rollers that are driven by a common driving source and convey the flexible medium belong;
- a comparing step of comparing driving conditions of the plurality of rollers that belong to the group that is selected;
- a determining step of determining whether or not an inconsistency exists in driving conditions of the plurality of rollers at the same time based on a result of the comparison; and
- a warning step of performing a warning when the determination result indicates that the inconsistency exists,
wherein the setting step, the transit time calculating step, the group selecting step, the comparing step, the determining step, and the warning step are carried out by the design support apparatus.

12. A non-transitory computer-readable storage medium that stores a program executable by a computer to implement a design support method that verifies a design for conveying a flexible medium based on the design information relating to a conveying path, the design support method comprising:
- a setting step of setting conveying conditions;
- a transit time calculating step of calculating a transit time when the flexible medium passes a characteristic point on the conveying path based the conveying conditions that are set;
- a group selecting step of selecting a group to which a plurality of rollers that are driven by a common driving source and convey the flexible medium belong;
- a comparing step of comparing driving conditions of the plurality of rollers that belong to the group that is selected;
- a determining step of determining whether or not an inconsistency exists in driving conditions of the plurality of rollers at the same time based on a result of the comparison; and
- a warning step of performing a warning when the determination result indicates that the inconsistency exists.

13. A design support method that verifies a design for conveying a flexible medium based on the design information relating to a conveying path in a design support apparatus, the method comprising:
- a setting step of setting conveying conditions; and
- a transit time calculating step of calculating a transit time when the flexible medium passes a characteristic point on the conveying path based the conveying conditions that are set,
wherein the design information includes a section distance between the characteristic points, a geometrical shape of the conveying path, and roller drive division information for grouping a plurality of rollers that convey the flexible medium with respect to each driving source,
wherein the conveying conditions include a sheet feeding time of the conveying path, a section speed, a stop time, a start-up time, and a shut-down time of the roller, and
wherein the setting step and the transit time calculating step are carried out by the design support apparatus.

14. A non-transitory computer-readable storage medium that stores a program executable by a computer to implement a design support method that verifies a design for conveying a flexible medium based on the design information relating to a conveying path, the design support method comprising:
- a setting step of setting conveying conditions; and
- a transit time calculating step of calculating a transit time when the flexible medium passes a characteristic point on the conveying path based the conveying conditions that are set,
wherein the design information includes a section distance between the characteristic points, a geometrical shape of the conveying path, and roller drive division information for grouping a plurality of rollers that convey the flexible medium with respect to each driving source, and
wherein the conveying conditions include a sheet feeding time of the conveying path, a section speed, a stop time, a start-up time, and a shut-down time of the roller.

* * * * *